(12) United States Patent
Moffat et al.

(10) Patent No.: US 7,454,310 B2
(45) Date of Patent: Nov. 18, 2008

(54) METHOD FOR CALCULATING BUSINESS PROCESS DURATIONS

(75) Inventors: Alex Moffat, Austin, TX (US); Damion Heredia, Austin, TX (US); Phil Gilbert, Austin, TX (US); Petko Chobantonov, Austin, TX (US); Daniela Chobantonova, Austin, TX (US); Morten Moeller, Austin, TX (US); Chris Miles, The Woodlands, TX (US); Scott Bonneau, Ithaca, NY (US)

(73) Assignee: Lombardi Software, Inc., Austin, TX (US)

( * ) Notice: Subject to any disclaimer, the term of this patent is extended or adjusted under 35 U.S.C. 154(b) by 614 days.

(21) Appl. No.: 11/117,763

(22) Filed: Apr. 26, 2005

(65) Prior Publication Data

US 2005/0251793 A1 Nov. 10, 2005

Related U.S. Application Data

(60) Provisional application No. 60/568,906, filed on May 7, 2004.

(51) Int. Cl.
*G05B 19/00* (2006.01)
*G06F 15/00* (2006.01)

(52) U.S. Cl. .................................................. 702/176

(58) Field of Classification Search .................. 702/176
See application file for complete search history.

(56) References Cited

U.S. PATENT DOCUMENTS

| 6,556,950 B1 * | 4/2003 | Schwenke et al. | 702/183 |
|---|---|---|---|
| 7,130,807 B1 * | 10/2006 | Mikurak | 705/7 |
| 2002/0174093 A1 * | 11/2002 | Casati et al. | 707/1 |
| 2004/0186927 A1 * | 9/2004 | Eryurek et al. | 710/12 |
| 2004/0216039 A1 * | 10/2004 | Lane et al. | 715/511 |
| 2005/0065756 A1 * | 3/2005 | Hanaman et al. | 703/2 |
| 2005/0222897 A1 * | 10/2005 | Walter et al. | 705/10 |

* cited by examiner

*Primary Examiner*—Michael P. Nghiem
*Assistant Examiner*—Cindy H Khuu
(74) *Attorney, Agent, or Firm*—HulseyIP Intellectual Property Lawyers, PC

(57) ABSTRACT

Provided is a system and method for calculating a time duration for a process or portion of a process. A timing interval based upon a single business process view can function regardless of multiple execution process paths. The claimed subject matter separates the business process definition from the execution process definition such that tracking points, which do not depend upon any particular execution process definition, may be inserted into the business process. Also provided is a timing interval calculation based upon two or more tracking points corresponding to a start point of the timing interval and/or two or more tracking points corresponding to an ending point of the timing interval. A user can arbitrarily select timing point within a process and employ those timing points to collect data and populate reports in a manner that is zero-code, i.e. does not require the user to write computer code.

22 Claims, 20 Drawing Sheets

| RECORD ID | FIELD NAME | VALUE |
|---|---|---|
| 1 | COLOR | RED |
| 1 | # OF DOORS | 4 |
| 1 | TRANSMISSION | AUTO |
| 1 | MAKE | CHEVY |
| 2 | COLOR | BLUE |
| 2 | # OF DOORS | 2 |
| 2 | TRANSMISSION | MANUAL |
| 2 | MAKE | FORD |

| COLOR | # OF DOORS | TRANSMISSION | MAKE |
|---|---|---|---|
| RED | 4 | AUTO | CHEVY |
| BLUE | 2 | MANUAL | FORD |

⋮ ⋮ ⋮ ⋮

METHOD FOR CALCULATING BUSINESS PROCESS DURATIONS

CROSS-REFERENCE TO RELATED APPLICATION

This application claims the benefit of priority to U.S. Provisional Patent Application No. 60/568,906 entitled "METHOD FOR CALCULATING BUSINESS PROCESS DURATIONS," filed on May 7, 2004, and is incorporated herein by reference in its entirety.

BACKGROUND OF THE INVENTION

1. Technical Field

The invention relates generally to a business process management system and, more specifically, to a method of dynamically calculating the duration of a business process or part of a business process.

2. Description of the Related Art

Business process management (BPM) systems have become essential to the management of complex businesses in today's economy. Management teams face an increasingly complex and challenging business environment. For example, a typical business may consist of multiple locations, business streams and informational structures. In addition, a business often must handle fluidity in market conditions and changes in accounting requirements. Business performance may involve such aspects as supply chain management, financial compliance, customer service, plant maintenance and other processes. Each of these performance aspects can benefit from operational improvement, or process optimization.

Current BPM systems that provide process optimization typically focus on execution models rather than on functional models. A functional model, or business view, focuses on what specific jobs need to be performed within a system. An execution model, or process view, focuses on how those specific jobs are performed, or executed. In current process management systems, although information is collected based upon the functional view, the reporting of the collected information is based upon the business view. This becomes an issue when a change is made in the execution model because a change often necessitates a modification to the reporting process so that that a particular report corresponds to the functional model.

Three issues in process optimization are 1) velocity, or how fast a business identifies and responds to business events; 2) visibility, or the degree to which changes create affect ongoing processes; and 3) value, or the ultimate benefit or return on investment (ROI) derived from any particular change. Changes in the execution model may require a change in the reporting model, which is based upon a functional model, and this can affect velocity, visibility and value. With regard to velocity, extra steps require extra time because many BPM systems are designed to be durable rather than flexible. With regard to visibility, an execution model change that necessitates a functional model change can disrupt an entire business process. With regard to value, anything that increases the time and disruptive aspects of a business process change affects the cost of the change and the business' ROI.

In current BPM systems, changes to an execution definition of a business process may involve the addition, removal and reordering of components that implement the process as well as the creation, deletion and renaming of data variables or fields used for reporting the process. If data needed for reporting the process is associated with existing implementation components or variables, then changes to the process to improve execution or refine the process' structure may necessitate changes to reports even though the functional definition has not changed.

For example, it is often desirable in a process reporting system to measure the time necessary for a particular process or portion of a process to complete. This task becomes complicated when the execution definition changes and, even in the absence of change, complications arise if any particular job within the business process has more than one execution path. In addition, there may be ambiguity as to which particular events should be considered the start or end of a particular timing interval. In the event of ambiguity as to starting points and ending points, there is no way for Standard Query Language (SQL) to calculate a timing interval unless the interval is periodically recalculated.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIG. 15 illustrates an exemplary portion of a normalized data table.

FIG. 16 illustrates an exemplary "Denormalized" table, created according to the claimed subject matter, based upon the normalized table of FIG. 15.

DETAILED DESCRIPTION OF THE FIGURES

Although described with particular reference to a business system, the system and method of the present invention can be implemented in any system in which it is desirable to calculate process duration. Those with skill in the computing or business arts will also recognize that the disclosed embodiments have relevance to a wide variety of process systems in addition to those described below. In addition, the functionality of the present invention can be implemented in software, hardware, or a combination of software and hardware. The hardware portion can be implemented using specialized logic; the software portion can be stored in a memory and executed by a suitable instruction execution system such as a microprocessor.

Figure 1:
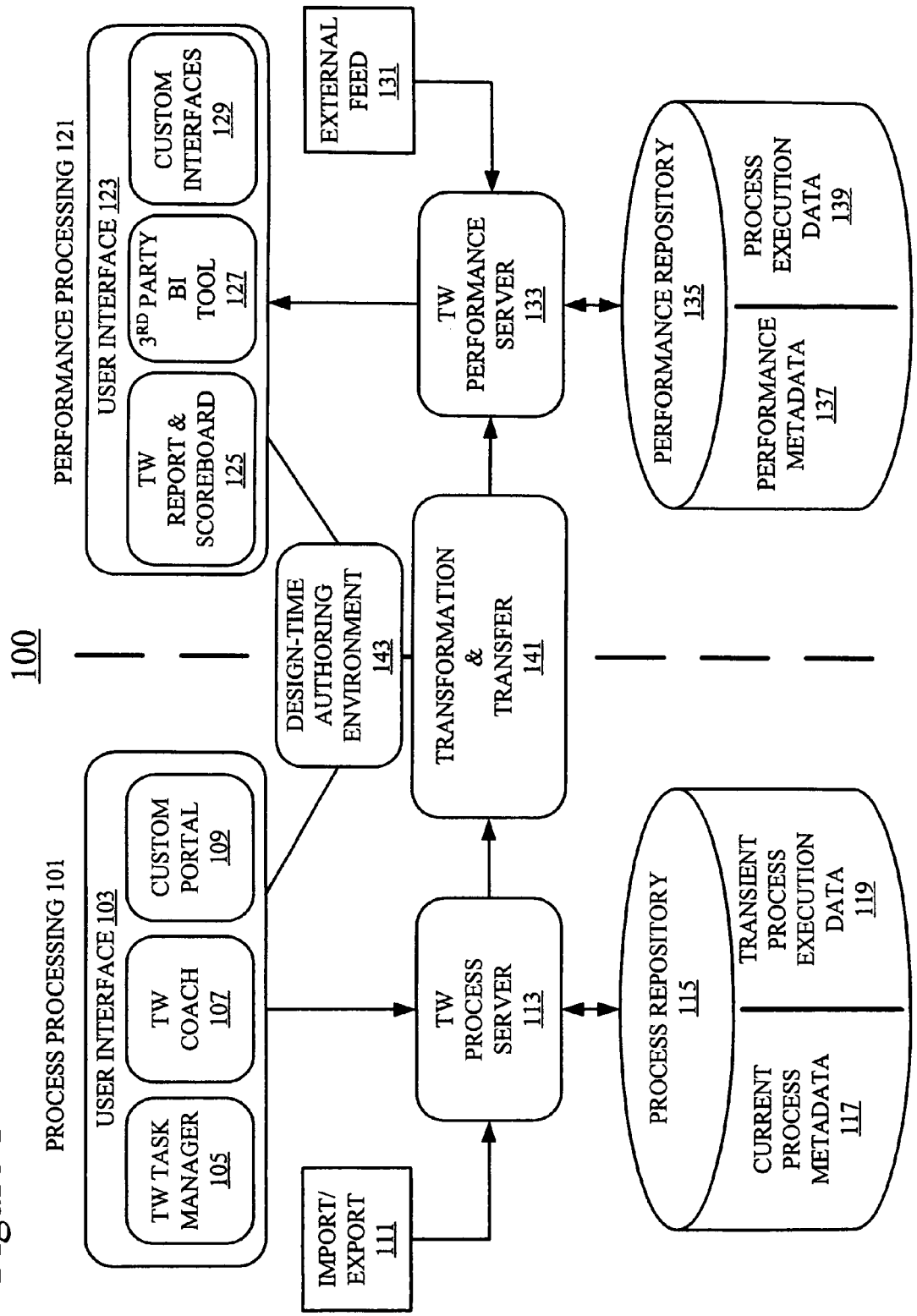
FIG. 1 is a block diagram of an exemplary Team Works Business Process Management (TW BPM) system according to the claimed subject matter.

Turning now to the figures, FIG. 1 illustrates an exemplary system architecture of a TeamWorks (TW) Business Processing Management (BPM) system 100. Typically, system 100 is implemented on one or more computing systems (not shown) and networks (not shown) and is implemented with respect to a specific business process. For the sake of simplicity, the following Specification describes the claimed subject matter only with respect to a loan approval and maintenance system. It should be noted that the loan process is used only as an example and that the claimed subject matter is equally applicable to most business systems.

System 100 is comprised of a Process Processing component 101 and a Performance Processing component 121, both of which are executed on the one or more computing systems. One advantage of the claimed subject matter over the prior art is the ability to separate these two aspects, i.e. processing, or execution, management and performance, or business, management, of any particular business system. Process Processing component 101 includes a user interface 103 that enables one or more users and/or other automated systems to interact with system 100 via common computer input/output devices (not shown) such as a monitor, keypad and mouse. Those with skill in the computing arts should be familiar with both the types of computing systems that may implement system 100 and the many different ways humans interact with such a computing system.

User interface 103 includes a TeamWorks (TW) task manager 105, a TW coach 107, and a custom portal 109. TW task manager 105 is a graphical user interface (GUI) that enables an end-user to manage in situ processes that are assigned to them. TW coach 107 walks end-users through a process by enabling the end-user to interact with a process in situ through whatever task they need to complete, such as entering information about the state of a loan that they are managing, i.e. inputting the loan amount, the names and addresses of the people seeking the loan, etc. A TW authoring environment 143 is used by process authors to create content that becomes a running process, with which the end-users eventually interact via such mechanisms as TW Task Manager 105 and TW Coach 107. In other words, authoring environment 143 is designed to lead a designer through the creation and management of tracking groups, tracking points and tracking fields, each of which is explained in more detail below in conjunction with FIGS. 7 through 9.

Authoring environment 143 simplifies the creation of business process definitions by implementing a TW "Zero-code" standard. TW Zero-code implies that a user does not have to resort to actual programming to use TW BPM system 100 for implementing a particular business process tracking and reporting environment. In addition, the Zero-code standard means the user does not have to manipulate a database in order to define, manage or report on a business process.

Authoring environment 143 communicates with a TW process server 113 and stores information in a process repository 115, both described below.

Custom portal 109 is an application programming interface (API) of system 100 that enables a user to develop and/or use individualized GUIs or other types of interfaces for access to system 100. Custom portal 109 also serves as a point of entry into system 100 for conventional BPM systems published by other vendors.

User interface 103, including components 105, 107 and 109, are coupled to TW process server 113, which executes the computer code associated with process processing 101 of TW BPM system 100. Process server 113 is explained in more detail below in conjunction with FIG. 2. Like custom portal 109, an import/export component 111 of system 100 enables customized modules and other BPM systems to interact with system 100. Unlike custom portal 109, input/output component 111 provides a direct link to APIs within TW process server 113.

TW process server 113 is coupled to process repository 115, which is a computer data storage device. As explained above, process repository 115 may be one or more of many types of data storage devices, such as, but not limited to, a hard disk drive or network of hard disk drives. Process repository 115 is divided into two logical partitions, a current process metadata partition 117 and a transient process execution data partition 119. Current process metadata partition 117 includes process metadata, i.e. information that defines user specified tracking data, or tracking groups, tracking points and tracking fields (see FIGS. 7-9). In addition to storing definitions of tracking data, partition 117 stores the relationship among individual elements of the tracking data and definitions for user defined reports. Transient process execution data partition 119 stores values for actual instantiations of the process metadata defined in partition 117, each instantiation corresponding to one or more currently executing business processes. Transient process execution data 119 also records the state of data collection tasks and processes.

Performance Processing component 121 includes a user interface 123 that enables one or more users and/or other automated systems to interact with system 100 via common computer input/output devices (not shown) such as a monitor, keypad and mouse. User Interface 123 includes a TW Report and Scoreboard 125, a Third Party Business Intelligence (BI) Tool 127 and a Custom Portal 129. TW Report and Scoreboard 125 is a GUI that enables users to define reports and monitor ongoing processes. Third Party BI Tool 127 and custom portal 129 provide access to Performance Processing component 121 for different business process software from multiple vendors and custom applications, respectively.

User Interface 123, and therefore interfaces 125, 127 and 129, communicate with a TW Performance Server 133, which handles the processing associated with implementing the functionality defined in interfaces 125, 127 and 129. TW Performance Server 133 is coupled to a Performance Repository 135, which is a data storage device or devices. Performance Repository 135 includes a Performance Metadata partition 137, which stores metadata corresponding to any implemented tracking data, or tracking data stored in Current Process Metadata 117 that is actually employed in a business process used by one of the interfaces 125, 127 and 129. In other words, Current Process Metadata 117 stores defined tracking data and Performance Metadata 137 stores tracking data that is both defined and instantiated with respect to a report, scorecard, or other process as a result of user input via user interface 123. In addition, Performance Metadata partition 137 stores information that correlates business data, i.e.

data as defined on the Performance Processing side 121, to specific execution data, i.e. data as defined on the Process Processing side 101. An External Feed module 131 provides a access point via APIs into TW Performance Server 133 for process data other than data from Process Processing 101. Performance Process Execution Data partition 139 stores data corresponding to actual instantiations of the tracking data stored in Performance metadata 137.

Finally, a Transformation and Transfer module 141 transmits tracking point data from TW Process Server 113 and Process Repository 115 to TW Performance Server 133 and Performance Repository 135. Specific, requested metadata may be retrieved by TW Process Server 113 from Process Repository 115 and, once delivered, stored by TW Performance Server 133 in Performance Repository 135. In other words, Transformation and Transfer module 141 can translate a request for performance data, employed by TW Performance Server 133 into a request for process data, employed by TW Process Server 113.

Figure 2:
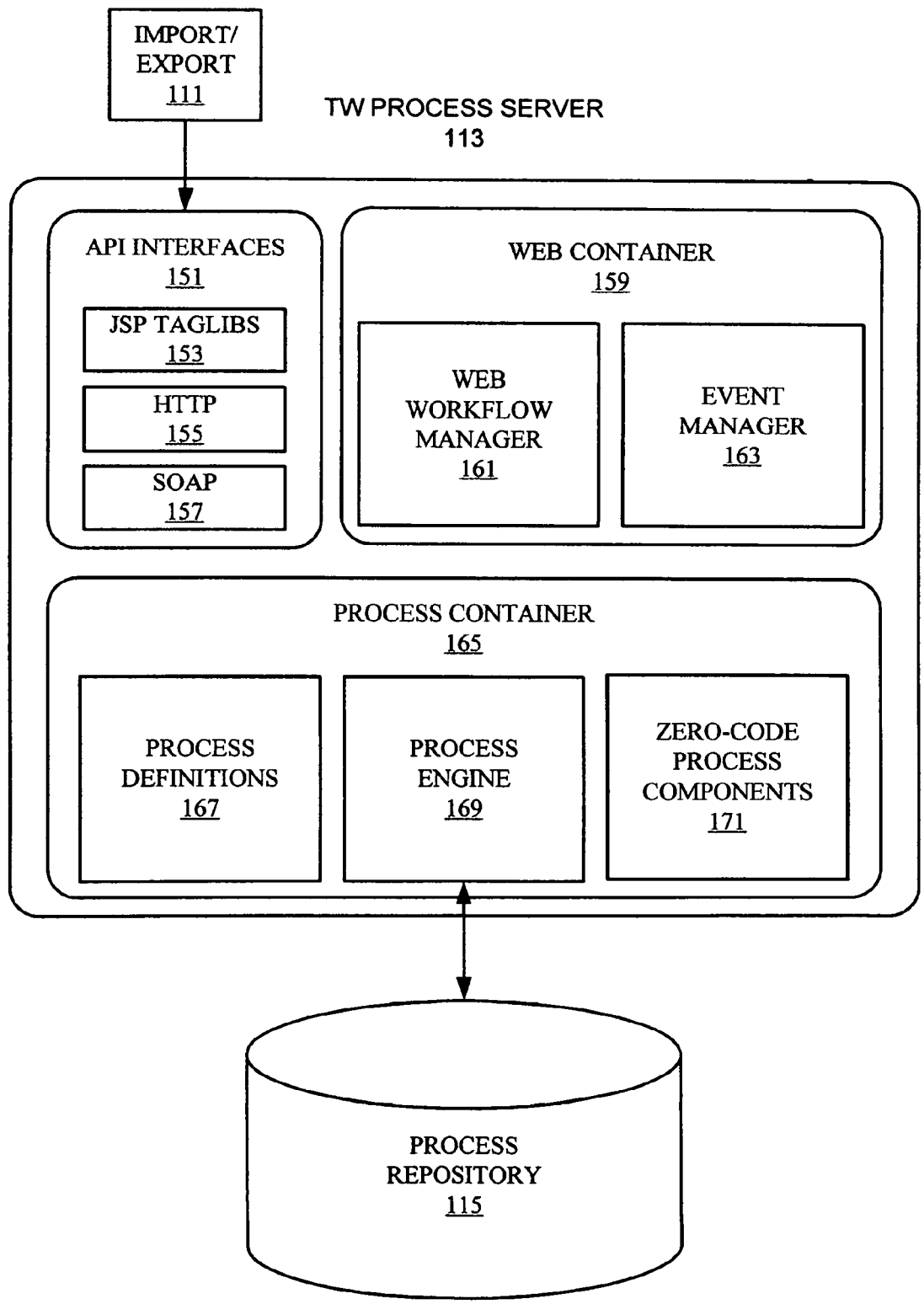
FIG. 2 is a block diagram of an exemplary Process server of the TW BPM system of FIG. 1.

FIG. 2 is a block diagram of TW Process Server 113 of FIG. 1 in more detail, including Import/Export module 111 and Process Repository 115. Import/Export module 111 communicates with TW Process Server 113 via API Interfaces 151. In this example, API Interfaces 151 includes Java Server Page (JSP) Tag libraries ("Taglibs") APIs 153, hypertext transfer protocol (HTTP) APIs 155 and Simple Object Access Protocol (SOAP) APIs 157. Of course, APIs 151, 153 and 155 are used as examples only. One with skill in the programming arts would appreciate that a wide variety of APIs can be developed to interface with both existing and yet to be developed protocols, as needed. Java is a programming language published by Sun Microsystems, Inc. of Santa Clara, Calif.

A Web Container 159 includes logic to manage TW Process Server's 113 communication via the Internet to and from, for example, users, TW Performance Server 133 (FIG. 1) and Transformation and Transfer module 141. It should be noted that the Internet is only one communication medium that may be employed by TW BPM system 100 (FIG. 1). Other examples include, but are not limited to, a dedicated network and direct connections, via either wireless or wired connections. Web Container 159 includes a Web Workflow Monitor 161 and an Event Manager 163. Web Workflow Monitor 161 manages outgoing communications and Event Manager 163 manages incoming communications, or "events."

In addition to Web Container 159, TW Process Server 113 also includes a Process Container 165, which performs tasks related to TW BPM system 100 tracking data. Modules within Process Container 165 include a Process Definitions module 167, a Process Engine module 219 and a Zero-code Process Components module 221. Process Definitions module 167 stores the various relationships among tracking data, including tracking groups, tracking points, tracking fields. In addition, Process Definitions module 167 stores rules associated with business processes such as a particular path a specific loan needs to follow based upon the size of the loan. Process Engine module 169 interprets rules stored in Process Definitions module 167 and performs any necessary calculations related to the tracking data. Process Engine module 169 also handles data storage and retrieval in conjunction with Process Repository 115. Zero-code Process Components module 171 correlates tracking data and its relationships to graphical icons so that a user who employs Authoring Environment 143 (FIG. 1) may manipulate tracking data by defining new tracking data and new relationships within the tracking data without resorting to actual programming in a computer language.

Figure 3:
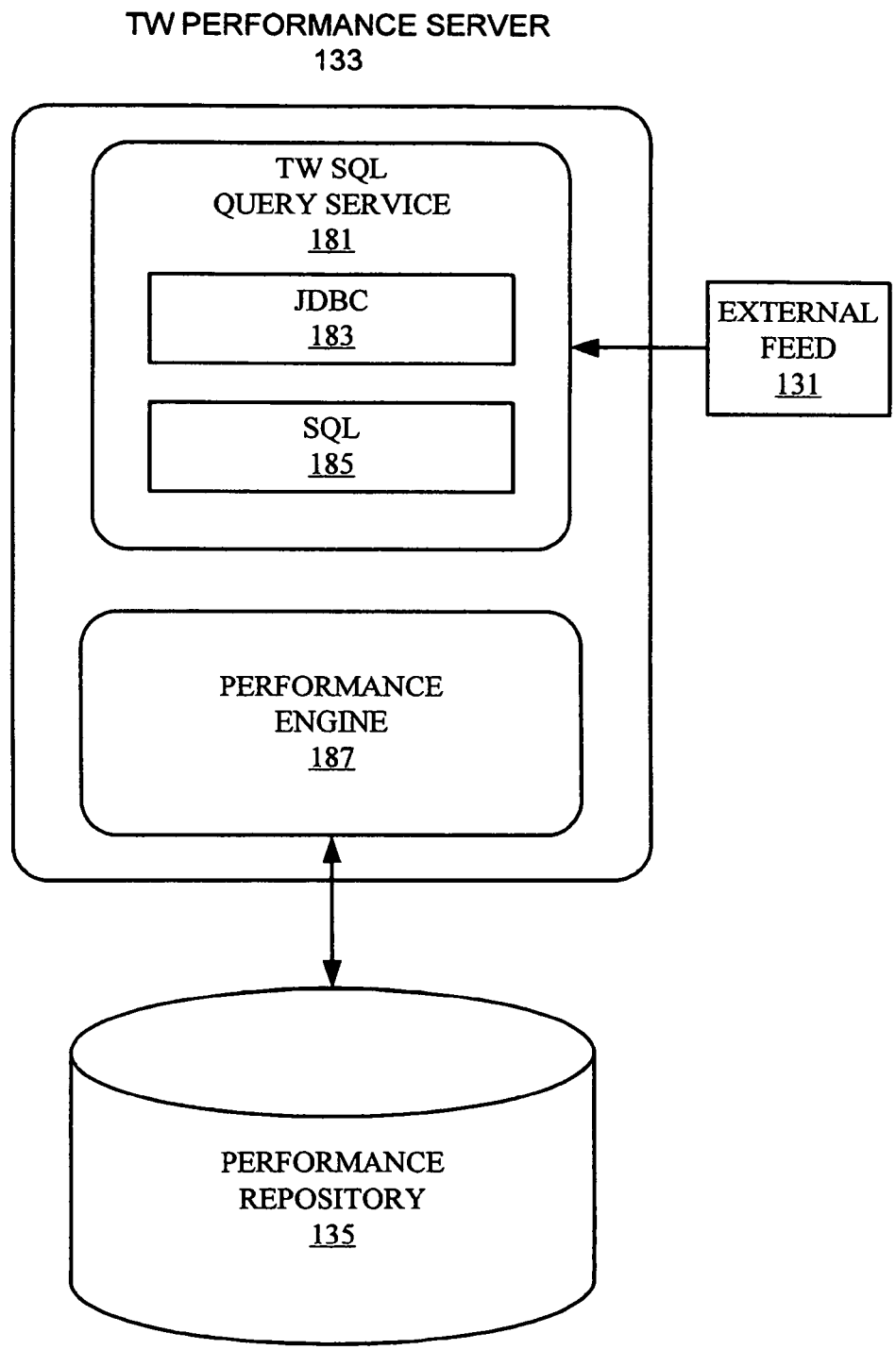
FIG. 3 is a block diagram of an exemplary Performance Server of the TW BPM system of FIG. 1.

FIG. 3 is a block diagram of TW Performance Server 133 of FIG. 1 in more detail, including External Feed module 131 and Performance Repository 135. External Feed module 131 communicates with TW Performance Server 133 via a TW Structured Query Language (SQL) Service component 181. In this example, TW SQL Service component 181 includes a Java Database Connectivity (JDBC) module 183, which is a Java API that enables Java programs to execute SQL statements against a SQL database, and a SQL module 185, which enable TW Performance Server 133 to execute standard SQL statements. TW Performance Service 133 also includes a Performance Engine 187 that executes JDBC and SQL commands from TW SQL Service component 181.

Performance Engine 187 handles all communications to and from Performance Repository 135. In addition, performance engine 187 translates TW Query Language (TWQL) queries into Structured Query Language (SQL) queries. For example, a sample TWQL query may take a form such as the following:

```
select
    aString,
    aNumber,
    aDateTime,
    aNewNumber
from
    MyGroup
where
    aString >= 'A' AND
    aNumber >= 0 AND
    aNumber >= aNewNumber.
```

Specific lines of the TWQL query above will be referred by the tag "TWQL" followed by the line number, e.g. the first line "select" is referred to as "TWQL [1]."

The TWQL query above is converted by Performance Engine 187 into a SQL query form such as the following:

```
select
    t0."f3"
    t0."f2"
    t0."f1"
    t0."f4"
from
    (
    select
        max (case when val.tracked_field_id = 1 then val.value_dt else null end) as "f1",
        max (case when val.tracked_field_id = 13 then val.value_num else null end) as "f4",
        max (case when val.tracked_field_id = 3 then val.value_str else null end) as "f3",
        max (case when val.tracked_field_id = 2 then val.value_num else null end) as
```

-continued

```
"f2"
    from
        LSW_TRACKED_FIELD_VALUE val,
        (
        select distinct
        sub_val.tracking_point_value_id
        from
            LSW_TRACKED_FIELD_VALUE sub_val
        where
            (
            sub_val.tracking_group_id = 1
            AND
                (
                    (
                    sub_val.value_tstr >= 'A'
                    AND
                    sub_val.tracked_field_id = 3
                    )
                OR
                    (
                    sub_val.value_num >= 0
                    AND
                    sub_val.tracked_field_id = 2
                    )
                )
            )
        group by
            sub_val.tracking_point_value_id
        having
            count(*) = 2
        ) sub
    where
        (
        val_tracking_group_id = 1
        AND
        val_tracking_point_value_id = sub.tracking_point_value_id
        )
    group by
        val.tracking_point_value_id
) t0
where
    (
    t0."f3" >= 'A'
    AND
    t0."f2" >= 0
    AND
    t0."f2" >= t0."f4"
    )
```

Like the TWQL query described in lines TWQL [1] through TWQL [11] above, the specific lines of the SQL query are referred to by SQL and line number, e.g. the first line "select is referred to as "SQL [1]."

The lines TWQL [2] through TWQL [5] represent variables, or "aString," "aNumber," "aDateTime" and "aNewNumber," that are meaningful within a specific business process, perhaps to a user building a report. A report can be created, for example, in TW Report & Scoreboard 125. The lines SQL [2] through SQL [5] represent tables and data fields, or "t0.'f1'," "t0.'f2'," "t0.'f3'" and "t0.'f1'," that have meaning within an execution environment and are dynamically determined relative to the process variables based upon values assigned in the tracking data, i.e tracking groups, tracking points and tracking fields (see FIGS. 7-9). Information that enables Performance Engine 187 to assign specific execution data to meaningful process variable names is stored in Performance Metadata 137 (FIG. 1) of Performance Repository 135. It should be noted that a user building a report with TWQL queries does not need to know either a table or variable that a selected process variable is stored in the Process Repository (FIGS. 1 and 2) or Performance Repository 135. In addition, a particular process variable may represent an expression composed of multiple execution variables, fields and other data (see FIG. 10). In other words, Performance Engine 187 translates a TWQL query into a SQL query using information stored in and dynamically retrieved from Performance Metadata 137.

In this manner, a user building a report does not need to know how any particular business process data is related to specific execution data. In addition, the relationship between business process data and execution data can be defined or redefined such that execution processes can be changed without affecting either reports or how a user views a particular business process.

Figure 4:
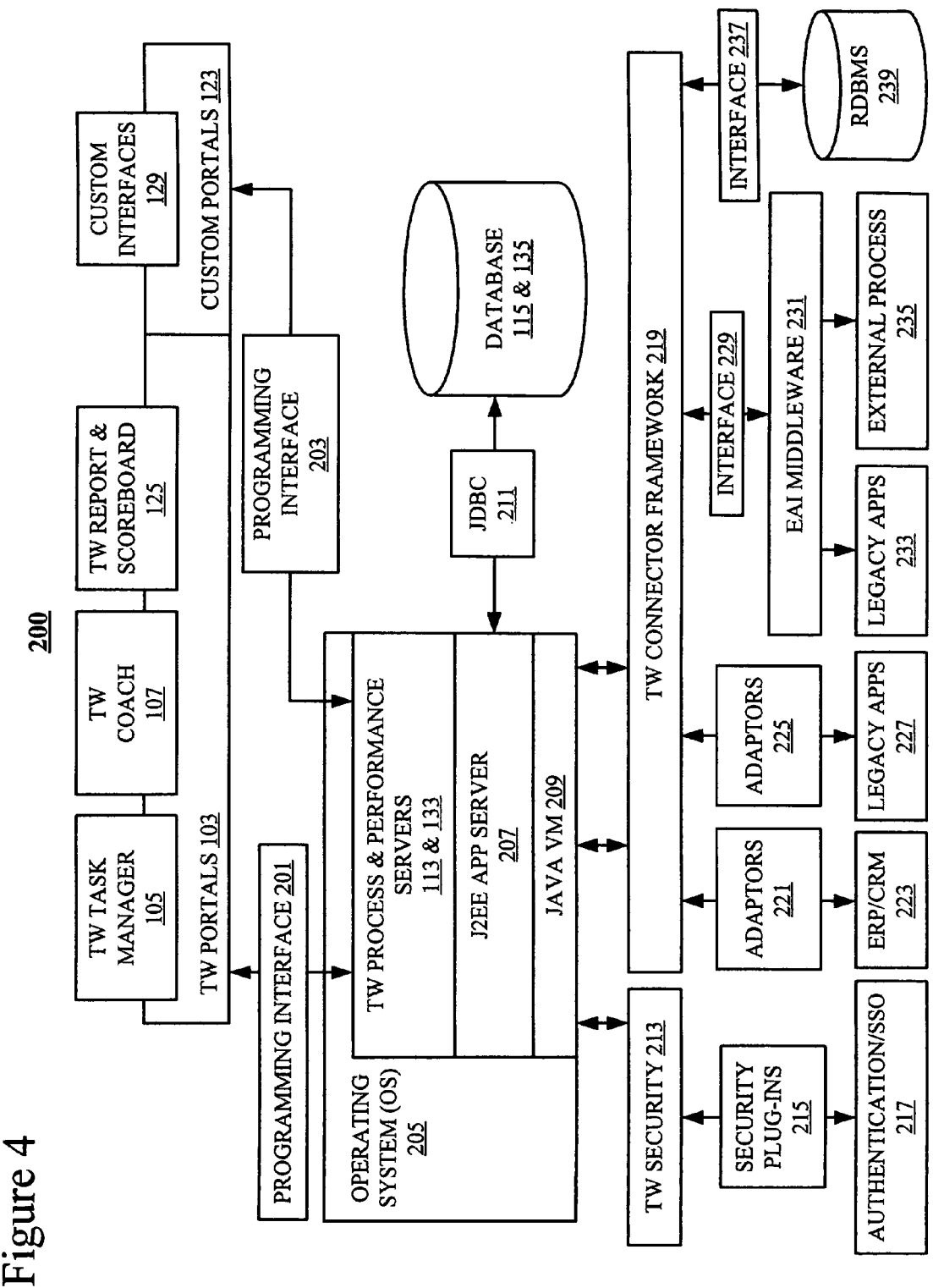
FIG. 4 is a block diagram of an exemplary business system that incorporates the TW BPM system of FIG. 1.

FIG. 4 illustrates TW BPM system 100 (FIG. 1) in the context of an exemplary, business system 200. As shown in FIG. 1, each of TW Task Manager 105, TW Coach 107 and TW Report and Scoreboard 125 are coupled to business system 200 via User Interface 103, or a "TW Portals." Custom Interfaces 129 is coupled to business system 200 through User Interface 123, or a "Custom Portals." TW Portals 103 and Custom Portals 123 interact with an operating system (OS) 205 via Programming Interfaces 201 and 203, respectively. Examples of supported programming interfaces for both Programming Interfaces 201 and 203 include, but are not limited to, C#, which is published by Microsoft Corporation of Redmond, Wash., Java, JSP and SOAP.

TW Process Server 113 and TW Performance Server 133 operate in conjunction with OS 205 and a Java 2 Platform Enterprise Edition (J2EE) interface 207. J2EE interface 207 operates in conjunction with a Java Virtual Machine (VM) 209, a Java language interpreter that converts Java commands into instructions that are specific to OS 205. Those with skill in the computing arts should understand the different choices available to implement OS 205, the functionality that OS 205 provides to system 200, and how Java VM 209 interacts with OS 205. TW Process Server 113 and TW Performance Server 133 also interact with databases 115 and 135, respectively via J2EE Application Server 207 and a Java Database Connectivity module 211, which is a Java API specifically designed for connecting Java applications to various databases.

A TW Security module 213 provides a point for Security Plug-ins 215 to attach to business system 200. A plug-in is a software or hardware module that adds a specific feature or service to a larger system. In this example, Security Plug-ins 215 provides business system 200 with the ability to authenticate users via an Authentication module 217. A TW Connector Framework 219 functions as an interface between TW Process Server 113 and TW Performance Server 123 via J2EE Application Server 207 and Java VM 209.

An Adaptor 221 provides an integration point for Enterprise Resource Planning (ERP) and/or Customer Relationship Management (CRM) module 223 to be incorporated with business system 200 via TW Connector Interface 219. An Adaptor 225 enables legacy applications, or programs that were part of business system 200 prior to the implementation of TW BPM system 100, to be incorporated into business system 200, also via TW Connector Interface 219. Additional legacy applications 233 are incorporated via an Enterprise Application Integration (EAI) middleware component 231, which is connected to TW Connector Interface 219 through a programming interface 229. In this example, programming interface 229 is implemented using JDBC or SOAP but one with skill in the art should recognize that there are many possibilities. A programming interface 237, also implemented in this example using JDBC or SOAP, connects TW Connector Interface 219 to a Relational Database Management System (RDBMS). Some variety of DBMS is typically found in most business systems such as business system 200.

Figure 5A:
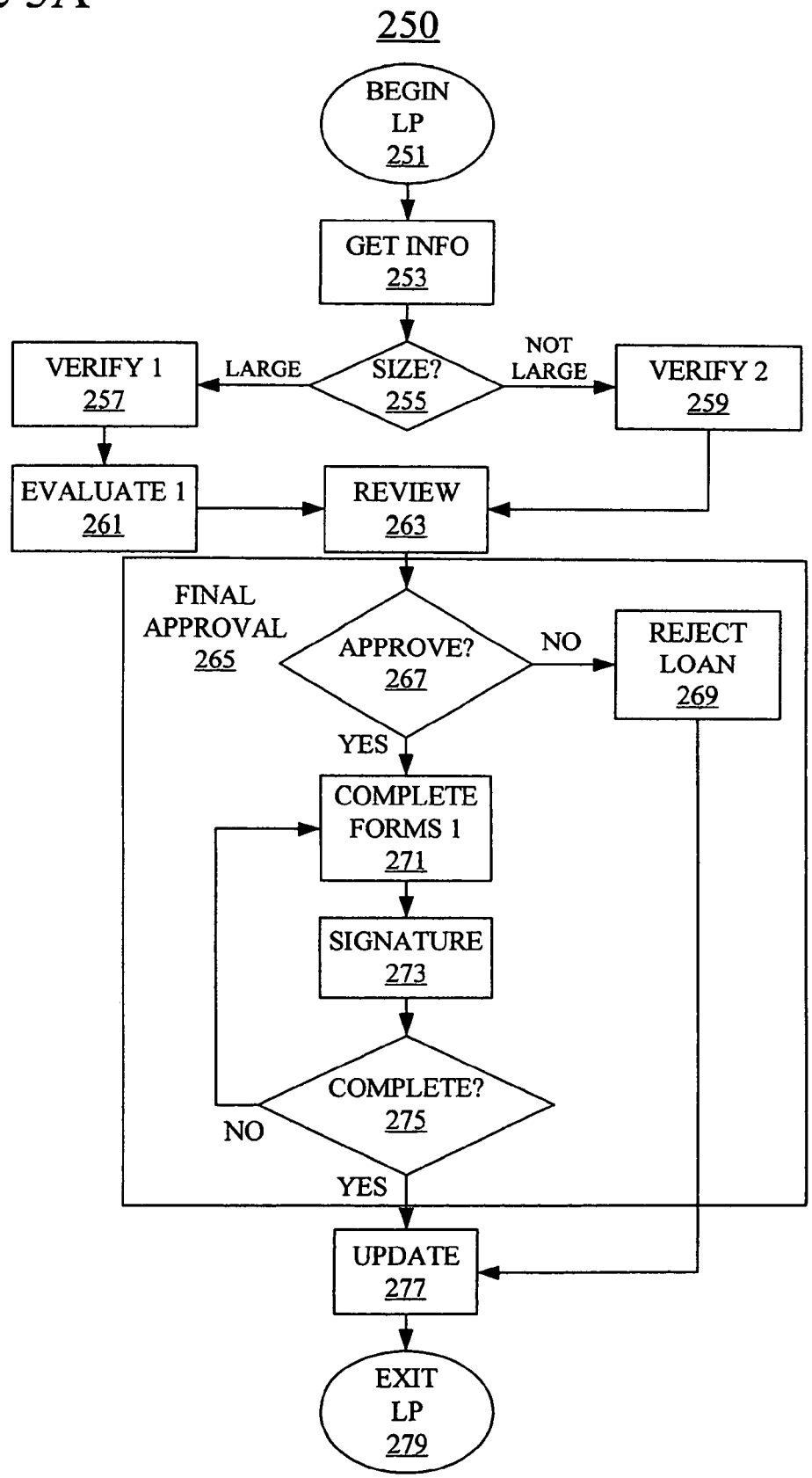
FIG. 5A is a flow chart of a particular loan approval business process that is employed as an example throughout the description.
Figure 5B:
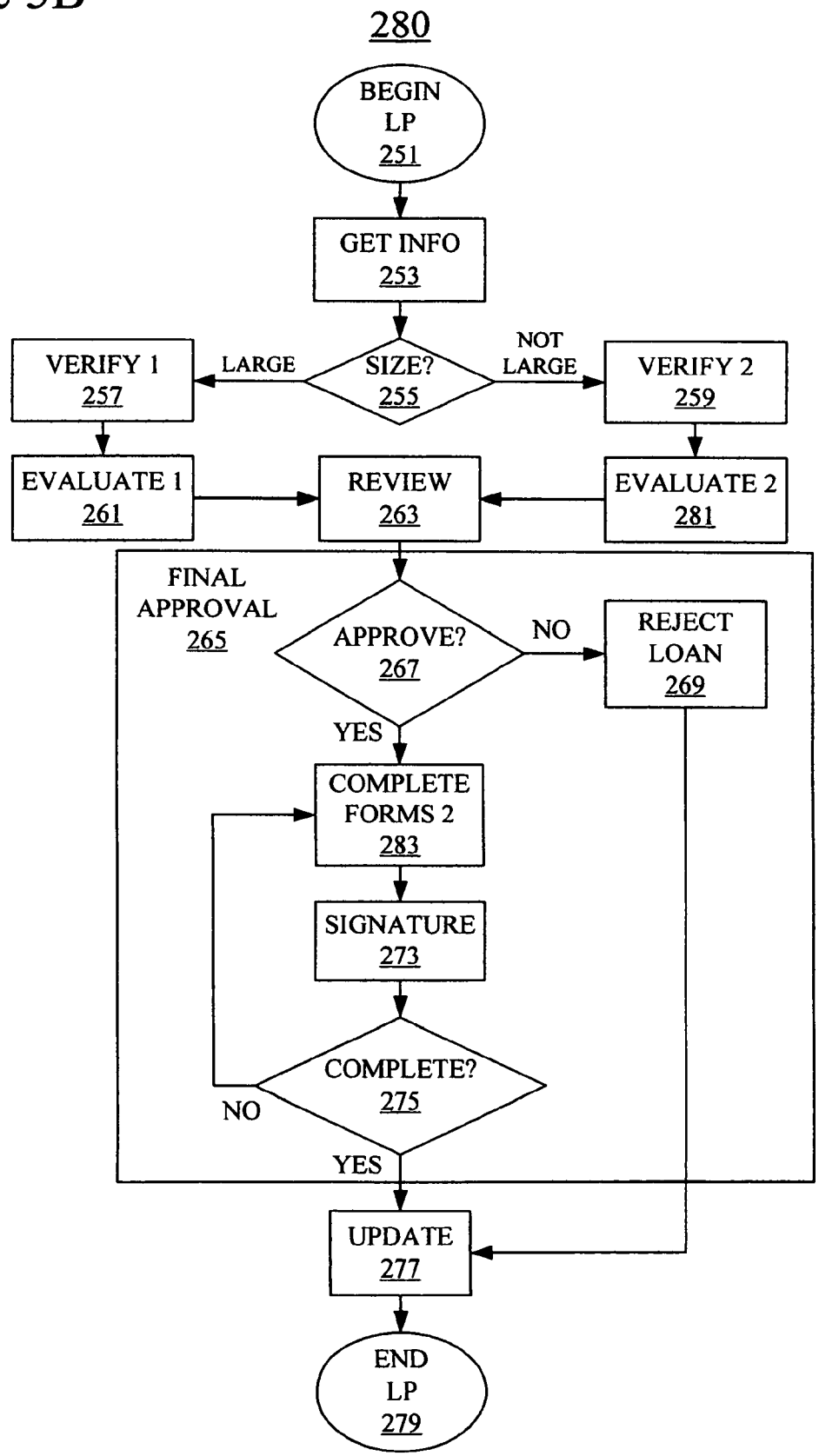
FIG. 5B is a flow chart of the loan approval business process of FIG. 5 with a few modifications.

FIGS. 5A and 5B illustrate two related example processes 250 and 280, respectively, both entitled "Approval Process." The specific steps of Approval Processes 250 and 280 represent an exemplary loan approval scenario. Neither the specific business processes nor the related steps are critical to the claimed subject matter but rather are used only for the sake of an example. In addition, no representation is implied that the steps of processes 250 and 280 represent an actual loan approval process; they are created solely as an example of one of many different types of business processes that may benefit from the claimed subject matter. Accordingly, specific steps are not described in any great detail. Other types of business processes include, but are not limited to, a manufacturing process, a transportation services process or a sales process.

Approval Process 250 begins in a "Begin Loan Process (LP)" step 251 and proceeds immediately to a "Get Info" step 253 during which loan information about a particular loan application is retrieved from a file or electronic database such as RDBMS 239 (FIG. 4). Control then proceeds to a "Size?" step 255 during which loan applications are divided based upon the amount of money requested. If the loan request represents a large amount of money, then control proceeds to a "Verify 1" step 257 and, otherwise, control proceeds to a "Verify 2" step 259. From Verify 1 step 257, control proceeds to an "Evaluate 1" step 261 during which a supervisor, because of the large amount of the loan, double checks the work performed in step 257. Control then proceeds to a "Review" step 263 during which all the loan documents are checked for completeness. From Verify 2 step 259, control proceeds directly to Review step 263.

In Final Approval section 265, control proceeds to an "Approve?" step 267 during which control is determined by the results of Review step 263. If the subject loan application is not approved, then control proceeds to a "Reject Loan" step 269 and then to an "Update" step 279 during which, in this example, RDBMS 239 is updated with the results of process 250.

If the loan application is approved in step 267 based upon the results of step 263, then control proceeds to a "Complete Forms 1" step 271 during which the loan applicant is prompted for any remaining information required to complete the loan application. Control then proceeds to a "Signature" step 273 during which the loan applicant is request to sign the loan application. Following Signature step 273, control proceeds to a "Complete?" step 275 during which process 250 determines whether or not the loan application contains all required information and signatures. If not, control returns to Complete Forms 1 step 271 and processing continues as described above. If, in step 275, the loan application is determined to be contain all necessary information and signatures, then control proceeds to Update step 277 during which RDBMS 239 is updated to reflect the current state of the loan application. Finally, control proceeds from step 277 to an "Exit LP" step 279 during which process 250 is complete.

FIG. 5B illustrates Loan Approval process 280, a modified version of Loan Approval 250. One difference between Loan Approval processes 250 and 280 is that Loan Approval process 280 includes an additional "Evaluate 2" step 281 in between Verify 2 step 259 and Review step 263. An administrator of process 250 may have decided that a loan application that does not qualify a s a large loan in step 255 nevertheless requires further evaluation, although not as extensive an evaluation as in Evaluate 1 step 261.

In addition, in Loan Approval process 280, Complete Forms 1 step 271 of process 250 is replaced with a "Complete Forms 2" step 283. Step 281 may represent an automation of step 271 or, in the alternative, a face-to-face interaction is replaced with an Internet-enabled process. Regardless, the claimed subject matter enables a user or administrator to modify the execution model of a particular business process without changing the business model and any reporting functionality that is based upon the business model.

Figure 6A:
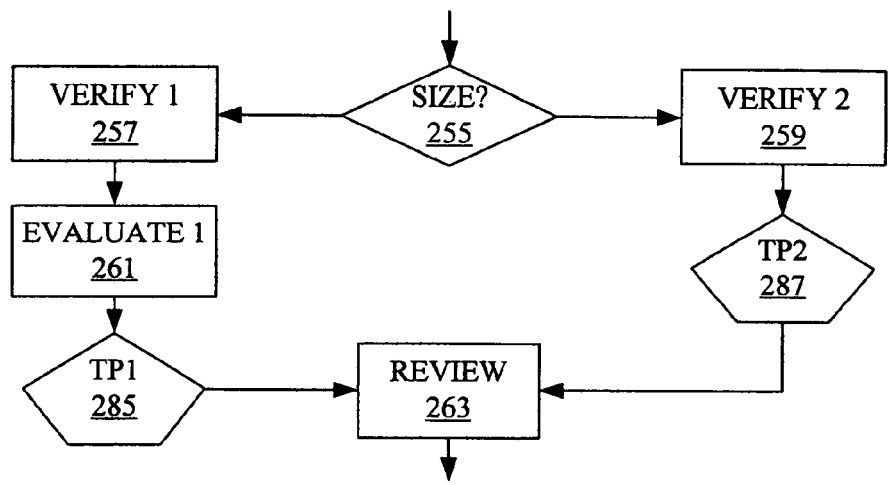
FIGS. 6A and 6B are flow charts of portions of the flow charts of FIGS. 5A and 5B, respectively, with tracking points added.
Figure 6B:
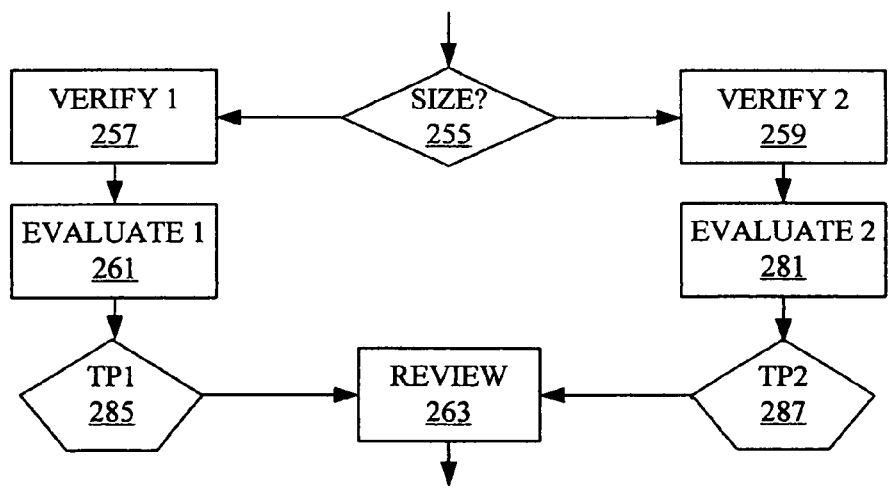

FIGS. 6A and 6B illustrate selected, modified portions of Loan Approval processes 250 and 280 described above in conjunction with FIGS. 5A and 5B, respectively. Specifically, steps 255, 257, 259, 261 and 263 of process 250 and steps 255, 257, 259, 261, 263 and 281 of process 280 are shown. In the examples of FIGS. 6A and 6B, a tracking point TP1 285 is positioned between step 261 and step 263 pf processes 250 and 280. A second tracking point "TP2" 287 is positioned between steps 259 and 263 of process 250 and between steps 281 and 263 in process 280.

A tracking point is a defined data collection function that gathers specified data at a particular point in a process such as Loan Approval processes 250 and 280. A "code_free" method of creation of tracking points is explained more fully below in conjunction with FIGS. 7-10. A code-free method of positioning tracking points within a process is illustrated below in conjunction with FIGS. 10 and 11. Basically, code-free implies that processes and data may be manipulated without a user needing to interact with a database.

The claimed subject matter enables a user of a particular business process to define and position tracking points, such as tracking points 285 and 287, within a business process such that the tracking points are independent of any particular implementation of the business process. For example, TP1 285 and TP2 287 are positioned within process 250, as illustrated in FIG. 6. When process 250 is modified, becoming process 280, TP1 285 and TP2 287 do not need to be modified or repositioned even though Evaluate 2 step 281 has been added. In this manner, reporting functionality represented by tracking points 285 and 287 is independent of any particular business model.

Figure 7:
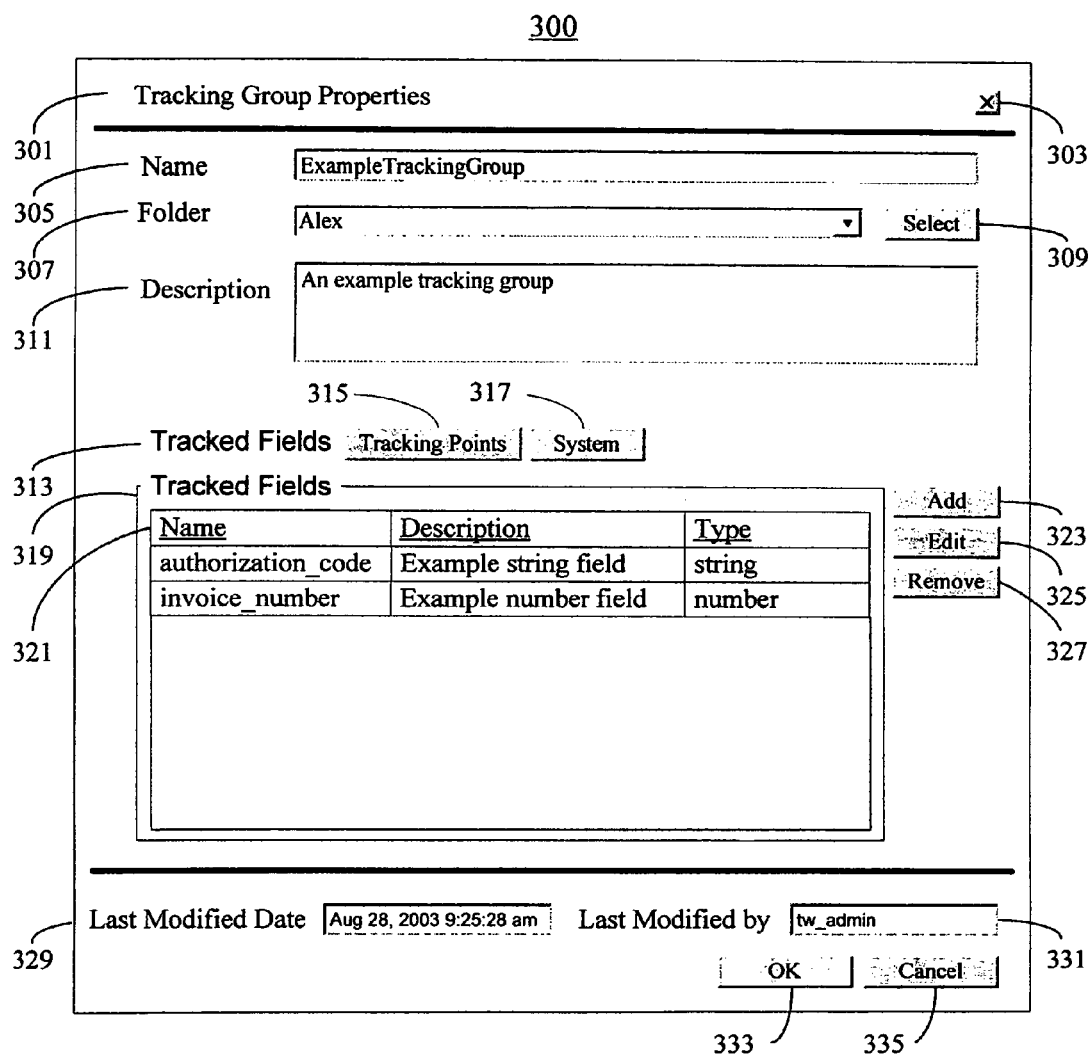
FIG. 7 is an illustration of a graphical user interface (GUI) for defining a tracking group according to the claimed subject matter.

FIG. 7 is an exemplary Tracking Group Properties screen 300 that enables a user to define and manage tracking groups according to the claimed subject matter. A tracking group is a virtual process corresponding to a particular business process.

A title bar 301 displays the name of the screen "Tracking Group Properties" and includes an Exit button 303 that enables the user to close screen 300. Exit button 303, which should be understood by those with experience with graphical user interfaces (GUIs), is selected by positioning a cursor (not shown) over button 303 and clicking on a mouse (not shown). Throughout this specification, the action of positioning a cursor on a GUI button or other input device and then clicking a mouse is referred to as "clicking on" the button or other device.

A Name data entry field 305 displays a currently selected tracking group, which can then be modified by utilizing other fields of screen 300. A user can select another tracking group by typing in the corresponding name in field 305. In this example, Name data entry field 305 is indicating that the currently selected tracking group is entitled "ExampleTrackingGroup." A Folder data display field 309 displays a folder, or computer directory, with corresponds to ExampleTrackingGroup tracking group. The user can select another folder by clicking on a Select button 309 to the right of field 307. In this example, the folder corresponding to ExampleTrackingGroup is entitled "Alex." A Description data entry field 311 enables the user to add a comment corresponding to the currently selected tracking group.

A Tracked Fields line 313 provides the user a choice between two types of tracking fields. A tracking field is a piece of data collected during a business process. By clicking on a Tracking Points button 315 the user can select to add, edit or delete tracking points associated with the selected tracking group. A tracking point is a specific location at which a tracking group is persisted. By clicking on a System button 317 the user can edit system variables associated with the selected tracking group. A display field 319 displays either the tracking points or the system variables depending upon with one of the buttons 317 or 319 is clicked. In this example, Tracking Points button 317 has been clicked so a Tracking Points table 321 is displayed.

Table 321 includes three columns, a Name column, a Description column and a Type column. Name column of table 321 lists the names of specific tracking points associated with the selected tracking group; i.e., in the example, tracking points entitled "authorization_code" and "invoice_number." Description column of table 321 provides a short description of the corresponding tracking point and Type column provides information a data type associated with the corresponding tracking point. In this example, tracking point authorization_code is of type string and tracking point invoice_number is of type number. Of course, other data types are possible within the claimed subject matter.

Three buttons, an Add button 323, an Edit button 325 and a Remove button 327, enable the user to manipulate the tracking point data displayed in table 321. Add button 323 enables the user to define a new tracking point; Edit button 325 enables the user to change the information corresponding to a selected, or highlighted, tracking point; and Remove button 327 enables the user to delete a highlighted tracking point.

A Last Modified Date data field 329 displays information about the last time the data displayed in screen 300 was modified. In this example, the information was modified on Aug. 28, 2003 at 09:25:28 am. A Last Modified By data field 331 associates a user ID with the last modification. In this example, the last user to modify the data displayed on screen 300 was the user associated with the user ID "tw_admin." Finally, an OK button 333 enables the user to exit screen 300 and accept and save any changes to the information displayed in the various fields and a Cancel button 335 enables the user to exit screen without saving any of the changes that may have been entered into the various fields.

Figure 8:
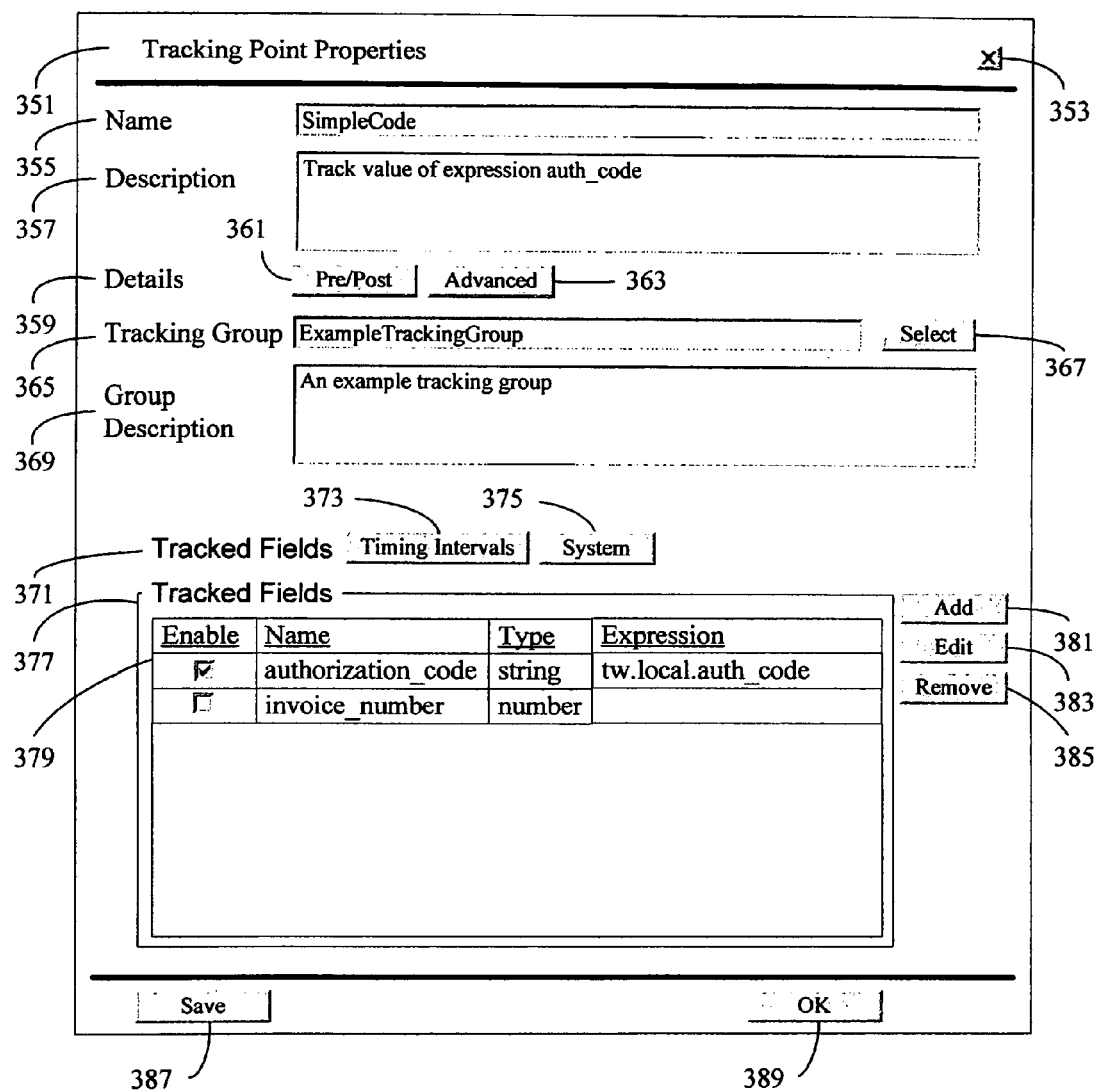
FIG. 8 is an illustration of a GUI for defining a tracking point according to the claimed subject matter.

FIG. 8 is an exemplary Tracking Point Properties screen 350 that enables a user to define and manage tracking points corresponding to tracking groups according to the claimed subject matter. A title bar 351 displays the name of the screen "Tracking Point Properties" and includes an Exit button 353 that enables the user, by clicking on button 353, to close the screen 350.

A Name data entry field 355 displays a currently selected tracking point, which can then be edited or modified by utilizing other fields of screen 350. A user may select another tracking point by typing in the corresponding name in field 355. In this example, Name data entry field 355 is indicating that the currently selected tracking group is entitled "SimpleCode." A Description data entry field 357 enables the user to add a comment corresponding to the currently selected tracking point.

A Details line 359 provides the user a choice between two types of possible tracking fields corresponding to the selected tracking point. By clicking on a Pre/Post button 361 the user can edit or modify particular tracking fields associated with the selected tracking point. By clicking on an Advanced button 363 the user can edit different variables associated with the selected tracking group. A tracking group data display field 365 provides the name of the tracking group associated with the currently selected tracking point. This example employs the ExampleTrackingGroup tracking group described above in conjunction with FIG. 7. A Select button 367 enables the user to choose another tracking group to associate with the selected tracking point. Group Description data entry box 369 enables the user to view and modify if necessary a comment field associated with the selected data tracking point.

A Tracked Fields line 371 includes two buttons, a Timing Intervals button 373 and a System button 375, which enable the user to select one of two different types of tracked fields to display and/or edit. A Tracked Fields data entry area 377 displays a Tracked Fields table 379, which includes an Enable column, a Name column, a Type column and an Expression column. The Enable column includes a check box corresponding to each row in the table 379. Each check box enables the user to specify whether or not the corresponding tracking field is active within the selected tracking point. The Name field displays the name of the corresponding tracking fields, i.e., in this example, "authorization_code" and "invoice_ number." The Type column indicates the data type of the corresponding tracking filed, i.e., in this example string or number data types. The Expression column enables the user to view and/or specify the derivation of the corresponding data filed. Using authorization_code as an example, the data filed is derived from the variable "tw.local.auth_code." Three buttons, an Add button 381, an Edit button 383 and a Remove button 385, like the Add, Edit and Remove buttons 323,325 and 327 (FIG. 7) enable the user to take corresponding actions with respect to a selected row of the tracked fields table 371.

Finally, a Save button 387 enables the user to exit screen 350 and accept and save any changes to the information displayed in the various fields. An OK button 389 enables the user to exit screen without saving any of the changes entered into the various fields.

Figure 9:
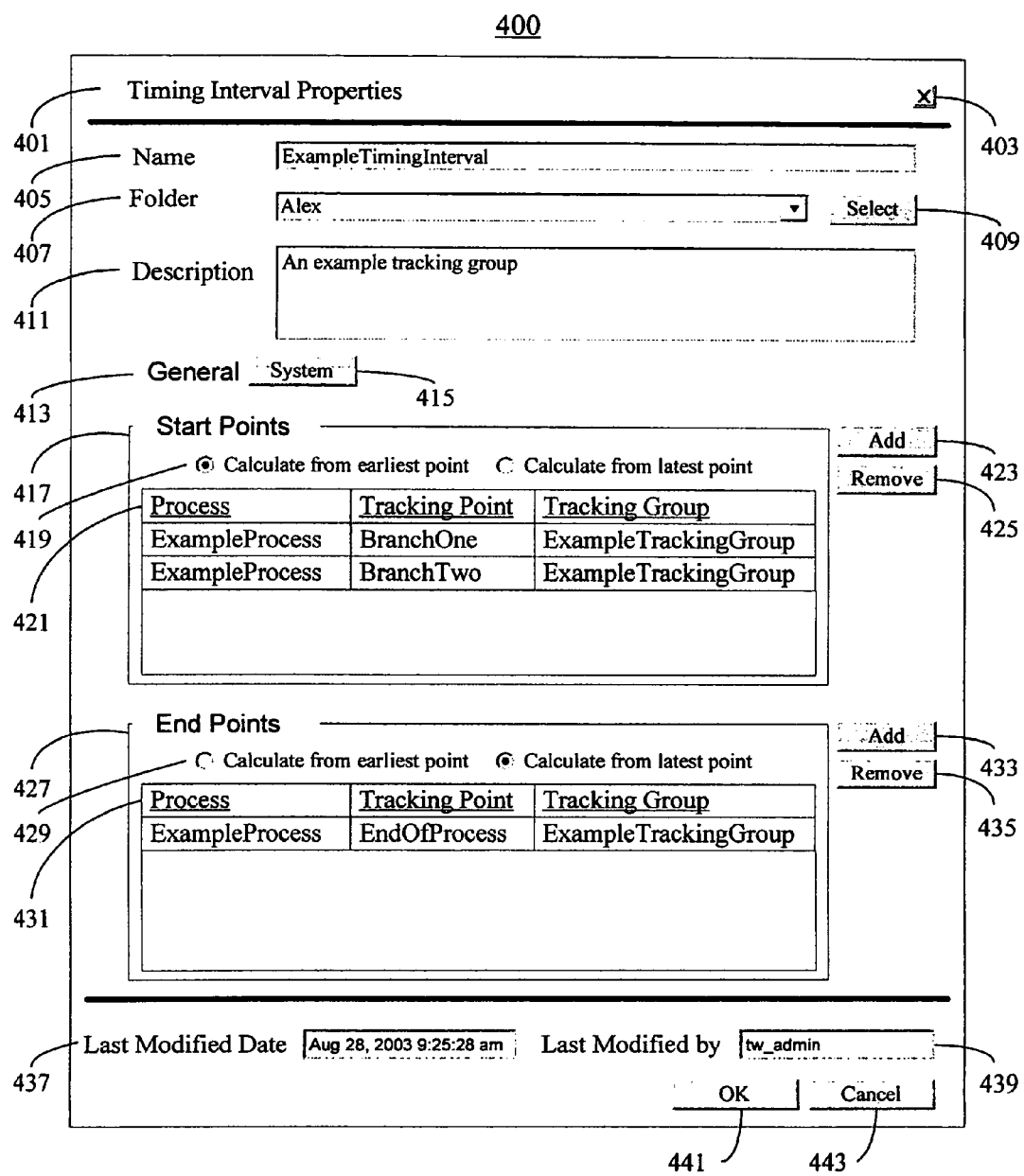
FIG. 9 is an illustration of a GUI for defining a timing interval according to the claimed subject matter.

FIG. 9 is an exemplary Timing Interval Properties screen 400 that enables a user to define and manage timing intervals according to the claimed subject matter. A timing interval is the execution time between two or more tracking points. A title bar 401 displays the name of the screen "Timing Interval Properties" and includes a Close button 403 that enables the user, by clicking on the Close button 403, to close and exit screen 400.

A Name data entry field 405 displays a currently selected timing interval, which can then be modified by utilizing other fields of screen 400. A user can select another timing interval by typing in the corresponding name in field 405. In this example, Name data entry field 405 is indicating that the currently selected timing interval is entitled "ExampleTimingInterval." A Folder data display field 409 displays a folder, or computer directory, with corresponds to ExampleTimingInterval. The user can select another folder by clicking on a Select button 409 to the right of field 407. In this example, the folder corresponding to ExampleTrackingGroup is entitled "Alex." A Description data entry field 411 enables the user to add a comment corresponding to the currently selected timing interval.

A General line 413 provides a System button 415 that enables the user to specify that the selected timing interval is applied to system variables. Below General line 413 are two data display and entry areas, a Start Points area 417 and an End Points area 427. Start Points area 417 enables the user to specify tracking points to use as the beginning of a timing interval and End Points area 427 enables the user to specify tracking points to use as the end point of a timing interval.

A table 421 of Start Points area 417 includes three columns, a Process column, a Tracking Point column and a Tracking Group column. The Process column displays processes employing the particular tracking intervals. In this example, two tracking points are listed and both correspond to the ExampleProcess process, which is a defined piece of a larger process. Tracking Point column shows that one of the two tracking points is positioned at a BranchOne of ExampleProcess and the other tracking point is positioned at a BranchTwo of ExampleProcess. The TrackingGroup column shows that both tracking points correspond to ExampleTrackingGroup (FIG. 7). An Add button 423 and a Remove button 425 enable the user to add or delete a highlighted row of table 421, respectively. A pair of radio buttons 419 enables the user to specify whether the timing interval corresponding to the two tracking points listed in table 421 begins with the first occurrence of the two tracking points or the last occurrence.

Like table 421 of Starts Point area 417, a table 431 of End Points area 427 includes three columns, a Process column, a Tracking Point column and a Tracking Group column. The Process column of table 421 displays processes employing the particular tracking intervals. In this example, one tracking point is listed, which corresponds to the ExampleProcess process. Tracking Point column of table 421 shows that the tracking point is positioned at an EndOFProcess point of ExampleProcess. The TrackingGroup column of table 421 shows that the tracking point corresponds to ExampleTrackingGroup. An Add button 423 and a Remove button 425 enable the user to add or delete a highlighted row of table 421, respectively. A pair of radio buttons 419 enables the user to specify whether the timing interval corresponding to the two tracking points listed in table 421 begins with the first occurrence of the listed tracking points or the last occurrence. In this case, since there is only one defined tracking point listed in table 421, the first and last occurrence would be the same.

A Last Modified Date data field 437 displays information about the last time the data displayed in screen 400 was modified. In this example, the information was modified on Aug. 28, 2003 at 09:25:28 am. A Last Modified By data field 439 associates a user ID with the last modification date displayed in data field 439. In this example, the last user to modify the data on screen 400 was the user associated with the user ID "tw_admin." Finally, an OK button 441 enables the user to exit screen 400 and accept and save any changes to the information displayed in the various fields and a Cancel button 443 enables the user to exit screen without saving any of the changes that may have been entered into the various fields.

Figure 10:
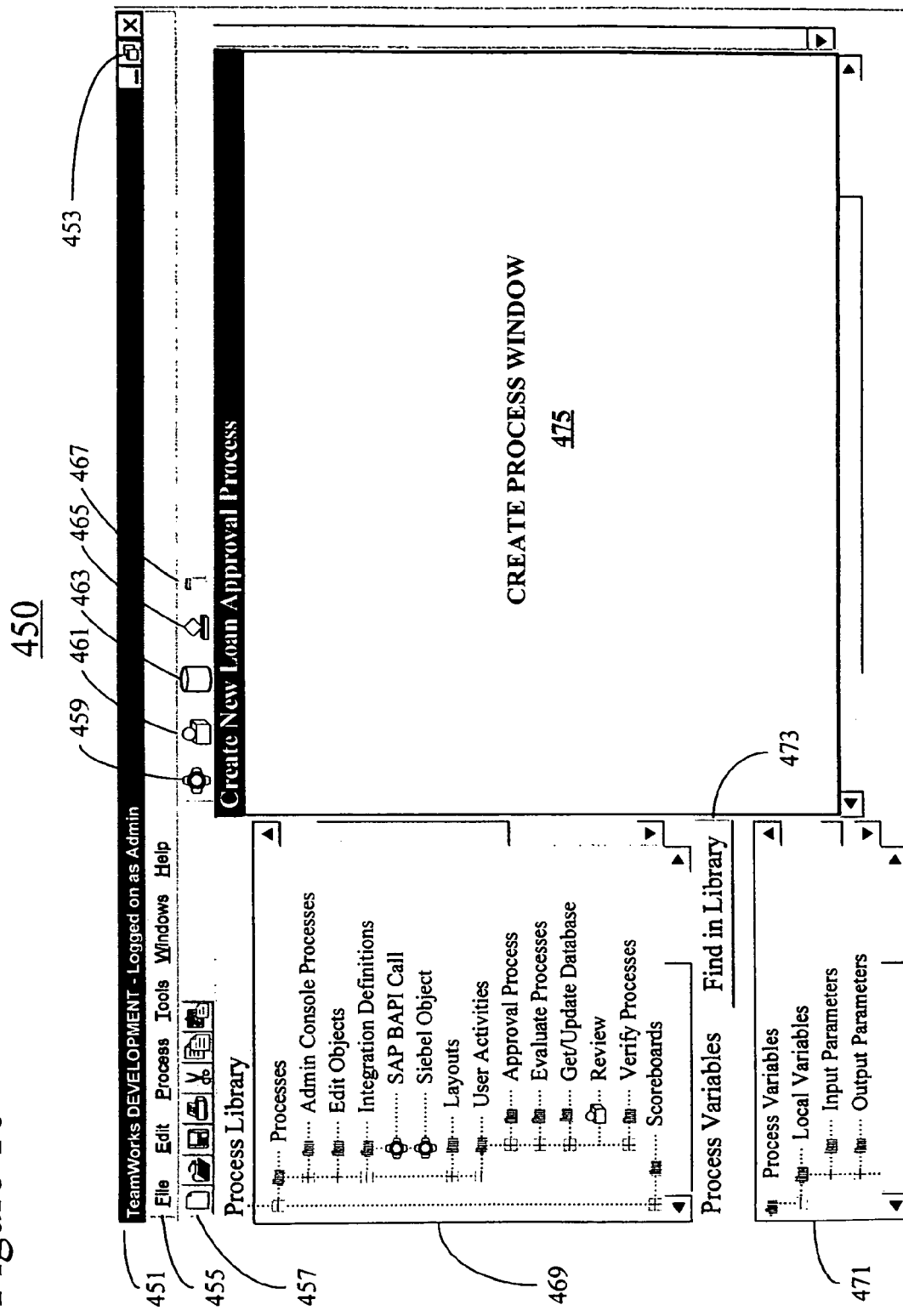
FIG. 10 is an illustration of a Windows GUI for defining a new business process.

FIG. 10 is an exemplary TW Process Development page 450 in a TeamWorks development environment. The setup of the computer window displaying TW Process Development page 450 should be familiar to those with skill in the Windows operating system. TW Process Development page 450 enables a user to define and manage process definitions by employing tracking groups (FIG. 7), tracking points (FIG. 8) and timing intervals (FIG. 9). A title bar 451 displays the name of the screen "TeamWorks Development," and an indication or the particular user currently logged into page 450, in this example, "Admin." Tile bar 451 also includes typical Windows interface buttons 453, specifically a "Maximize/Minimize" button, a "Restore" button and a "Close" button.

Other user interface components that should be familiar to Windows users are menu options 455, i.e. a "File" menu, an "Edit" menu, a "Process" menu, a "Tools" menu, a "Windows" menu and a "Help" menu. Below menu options 455 are a number of typical Windows toolbar buttons 457, including a "New File" button, an "Open" button, a "Save" button, a "Print" button, a "Cut" button, a "Copy" button and a "Paste" button.

Page 450 includes several icons, an "Integration Definition" icon 459, a "User Activity" icon 461, a "Database" icon 463, a "Decision," or "Branch," icon 465 and a "Tracking Point" icon 467. The user may click on icons 459, 461, 463, 465 and 467 to display other user interfaces. For example, by clicking on Tracking Point icon 467, the user can display Tracking Point Properties screen 350 (FIG. 8), which enables the user to create a new tracking point or edit an existing one. Other icons 459, 461, 463 and 456 also enable the user to display data entry screens for creating or editing integration definitions, user activities, decision boxes, and database activities, respectively.

A "Process Library" directory tree section 469 displays integration definitions, user processes, decision data (not shown) and timing intervals (not shown) that have been defined previously. The user can define processes with related timing intervals using a zero-code method by clicking on a particular entry in Process Library section 469 and "dragging" the entry into a "Create Process" window 475, which is described in more detail below in conjunction with FIG. 11. The zero-code method is a procedure for creating process definitions, tracking data definitions and reports such that the user does not need to perform actual computer programming.

Process Library section 469 is displaying a sampling of a directory tree structure for TW BPM system 100 (FIG. 1), including a Process node and a Scorecard node. The Process node includes various user defined processes available for inclusion in a larger business process, including a "User Activities" node. In this example, under the User Activities node, is an "Approval Processes" folder, an "Evaluate Processes" folder, a "Get/Update Database" folder, a "Review" process and a "Verify Processes" folder. Processes corresponding to these directory nodes are used as examples above in the flowchart of FIGS. 5A and 5B and the correlation between the nodes and the processes in FIGS. 5A and 5B is explained more fully below in conjunction with FIG. 11. The Scorecard node is explained more fully in conjunction with FIG. 14. As should be known by those with experience with Windows, a node that has a '+' symbol on the left side of its line can be expanded to show more nodes. A node with a '−' symbol indicates that the node is already expanded and may be compressed. A node without either a '+' symbol or a '−' symbol is already expanded as far as possible.

Finally, a "Process Variables" section 471 enables the user to view available, defined process variables and to access the process variables, if necessary. Examples of types of variables represented in section 471 include local variables, both input and output parameters corresponding to processes and scorecards, some of which are represented in section 469. A "Find in Library" button 473 enables the user to search a library of available process variable without searching through the directory tree displayed in section 471.

Figure 11:
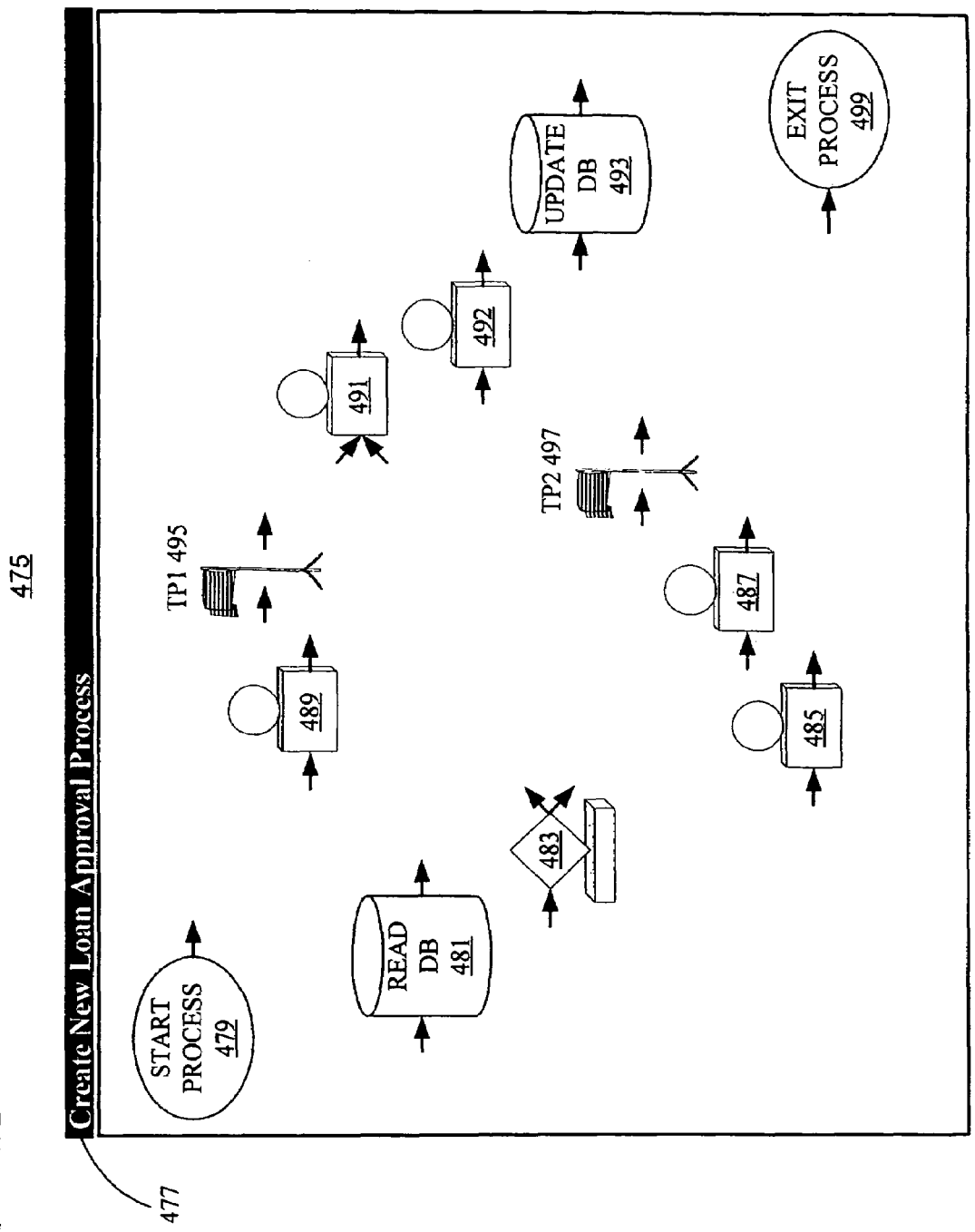
FIG. 11 is a more detailed view of a Create Process window within the GUI of FIG. 10.

FIG. 11 shows Create Process window 475 of FIG. 10 in more detail. A Title bar 477 displays the name of this particular window, i.e. "Create New Loan Approval Process." Create Process window 475 is displayed when the user clicks on the New button in toolbar buttons 457 (FIG. 10). In this example, the specific process displayed in window 475 is Loan Approval process 250 described above in conjunction with FIG. 5A.

To define a new process, in this example process 250, a user, one-by-one, clicks on nodes in Process Library 469 and drags corresponding icons, which look like icons 459, 461, 463, 465 and 467, into a process creation window, in this example window 473. Each dragged icon is then positioned within window 475 such that the position indicates where a particular functionality corresponding to the dragged icon fits into overall process 250. In short, to define a particular process, a user clicks upon a node in directory tree 469 (FIG. 10) and drags a selected icon representing a particular functionality into window 475. In this example, processing is performed based upon the position of icons, with icons positioned left going first. In more complicated processes, a line or lines may be drawn from icon to icon to enforce a sequence regardless of position.

Two icons, a "Start Process" symbol 479 and an "Exit Process" icon 499 correspond to Begin LP step 251 and Exit LP step 279, respectively. A Start step and an Exit step are typically part of many defined process and therefore may, if desired, automatically be placed in a new Create Process window upon instantiation. Get Info step 253 of process 250 corresponds to a "Read DB" icon 481, which because of its position as the first icon to the right of Start Process icon 479 indicates, as explained above in conjunction with FIG. 5, Set Info step 253 follows immediately after Begin LP step 251.

A Decision icon 483, corresponding to Size? step 255 of process 250, is displayed in window 475. Icon's 483 position indicates that the corresponding processing follows that of Read DB icon 481, as step 255 follows step 253 in process 250. Two arrows on the right side of icon 483 indicate that processing can take one of multiple directions: in this case, either proceeding to functionality represented by an icon 489, which corresponds to Verify 2 step 259, or to functionality represented by an icon 485, which corresponds to Verify 1 step 257. An icon 487, corresponding to Evaluate 1 step 261, is positioned to the right of icon 485.

An icon 491, corresponding to Review step 263, has two arrows pointing in on the left indicating that step 263 can be entered via multiple paths, specifically in this example by the two paths that originated at icon 483. To the right of icon 491 is an icon 492, corresponding to Final Approval section 265. It should be noted that any particular icon, e.g. icon 492, may represent a collection of separate processing blocks. In this example, steps 267, 269, 271, 273 and 275 are all represented by icon 492. The representation of process 250 in window 475 also includes an "Update DB" icon 493, corresponding to Update step 277, which precedes Exit Process icon 499.

Finally, two tracking point icons, a "TP1" icon 495 and a "TP2" icon 497, are positioned between icon 489 and icon 487, respectively and icon 491. TP1 icon 495 corresponds to Tracking Point 1 285 (FIG. 6) and TP2 icon 497 corresponds to Tracking Point 2 287 (FIG. 6).

As explained above, a user can define a process by clicking on a node of directory tree, such as the directory tree displayed in Process Library 469 and dragging an icon into a process window such as window 475. For example, to modify process 250 into process 280 (FIG. 5B), a user would double click upon the Evaluate Processes node of Process Library directory tree section 469 in order to expand the corresponding folder. Once expanded, the folder would include nodes representing Evaluate 1 step 261 and Evaluate 2 step 281. By clicking on the node representing Evaluate 2 step 281, dragging the corresponding icon into window 475 and positioning the icon between icon 489 and TP1 icon 495, the user would, in effect, be taking a step towards modify process 250 into process 280. To complete the modification, the user would need to enter Final Approval process 265 and replace Complete Forms 1 step 271 with Complete Forms 2 step 283. As can be seen, the claimed subject matter enables a user to create and edit business processes without the need of writing computer programming code.

Figure 12A:
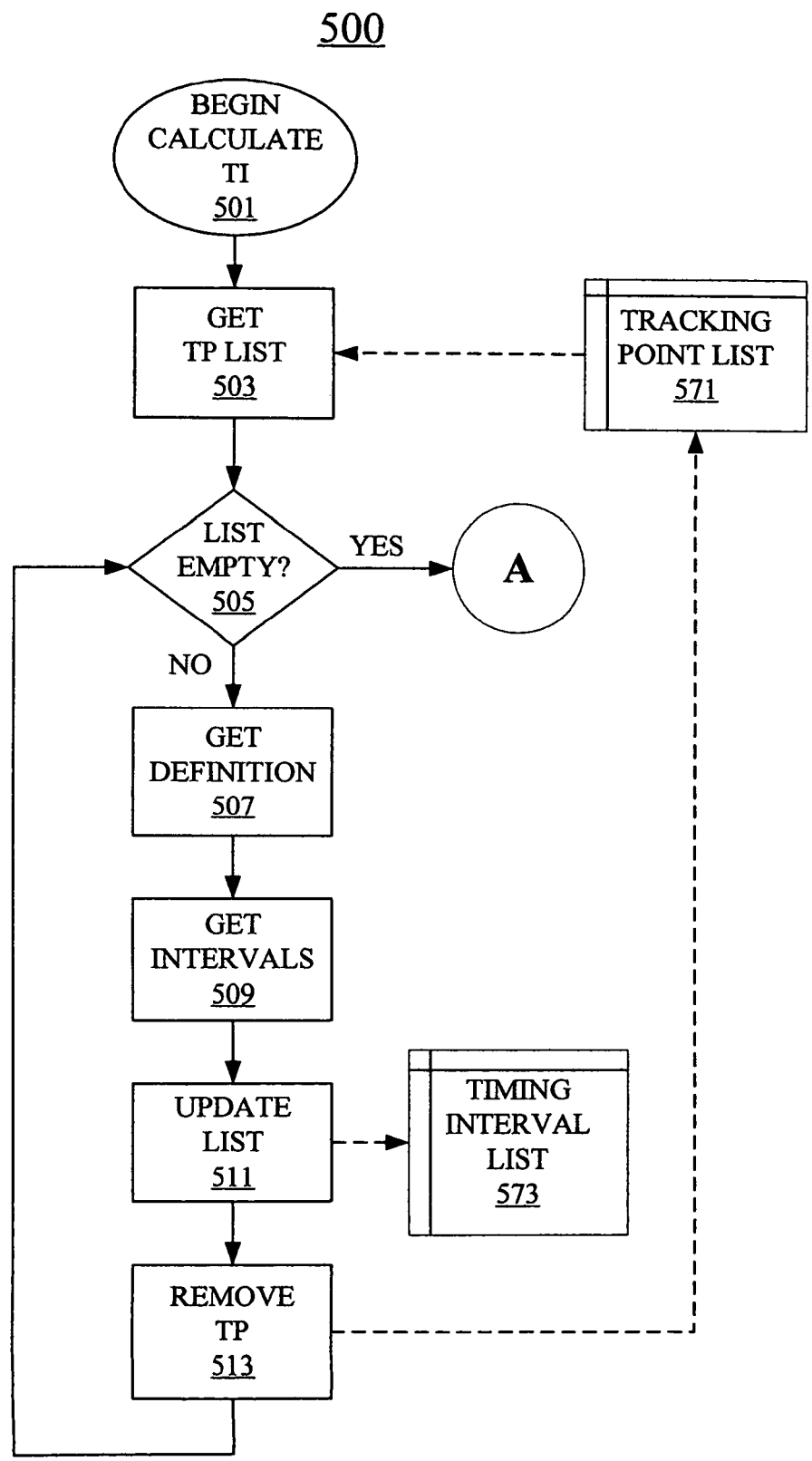
FIGS. 12A through 12E are a flow chart of a timing interval calculation process according to the claimed subject matter.

FIGS. 12A through 12E each represent a portion of a block diagram of a Timing Interval (TI) Calculation process 500. In FIG. 12A, processing begins in a "Begin Calculate TI" step 501 and control proceeds immediately to a "Get Tracking Point (TP) List" step 503. In step 503, a "Tracking Point List" data store 571, related to a particular functional task, are retrieved from Performance Repository 135 (FIGS. 1, 3 and 4) via TW Performance Server 133 (FIGS. 1, 3 and 4). Control then proceeds to a "List Empty?" step 505 during which Process 500 determines whether or not data store 571 contains any tracking point values.

Figure 12B:
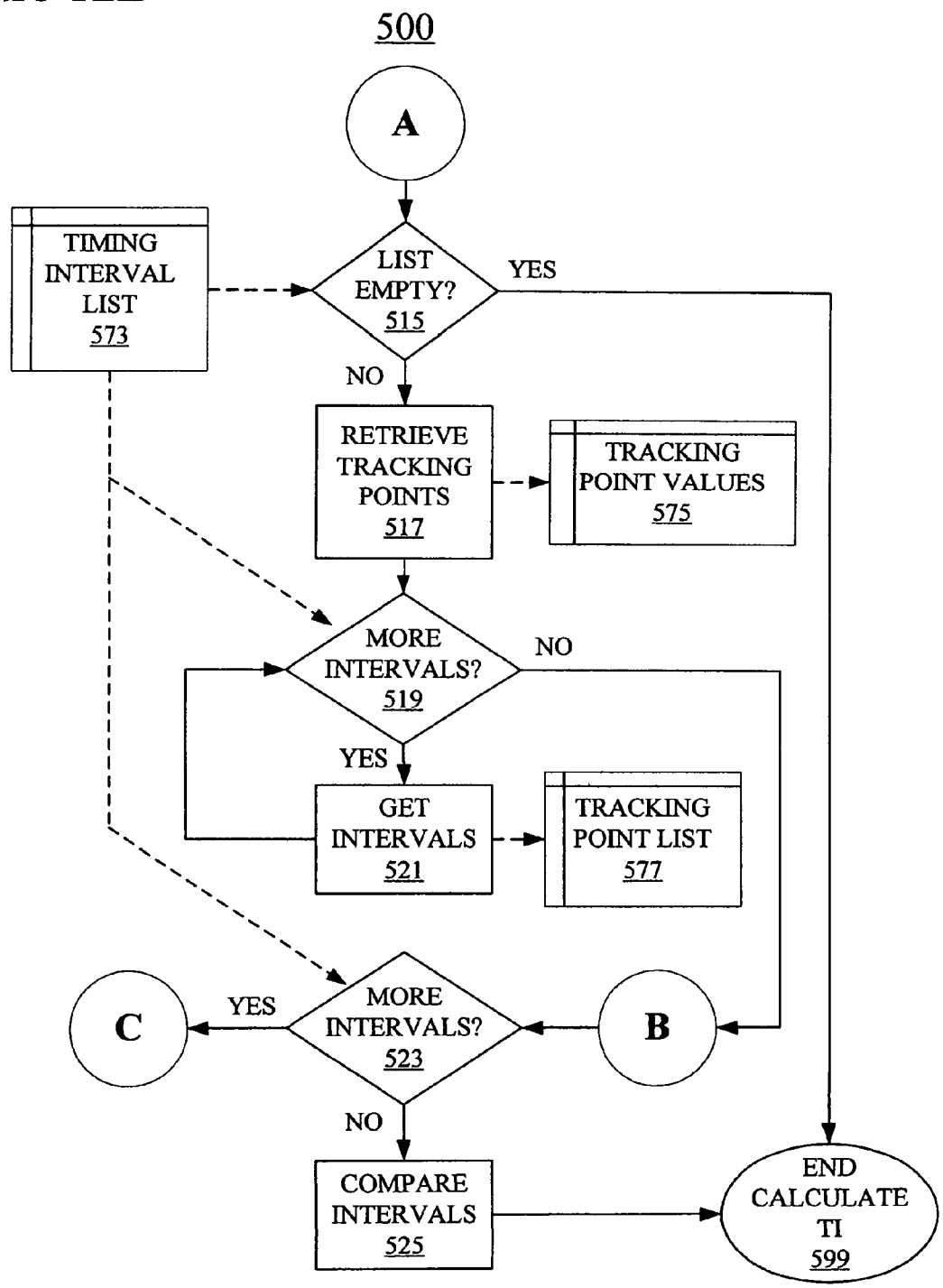
Figure 12C:
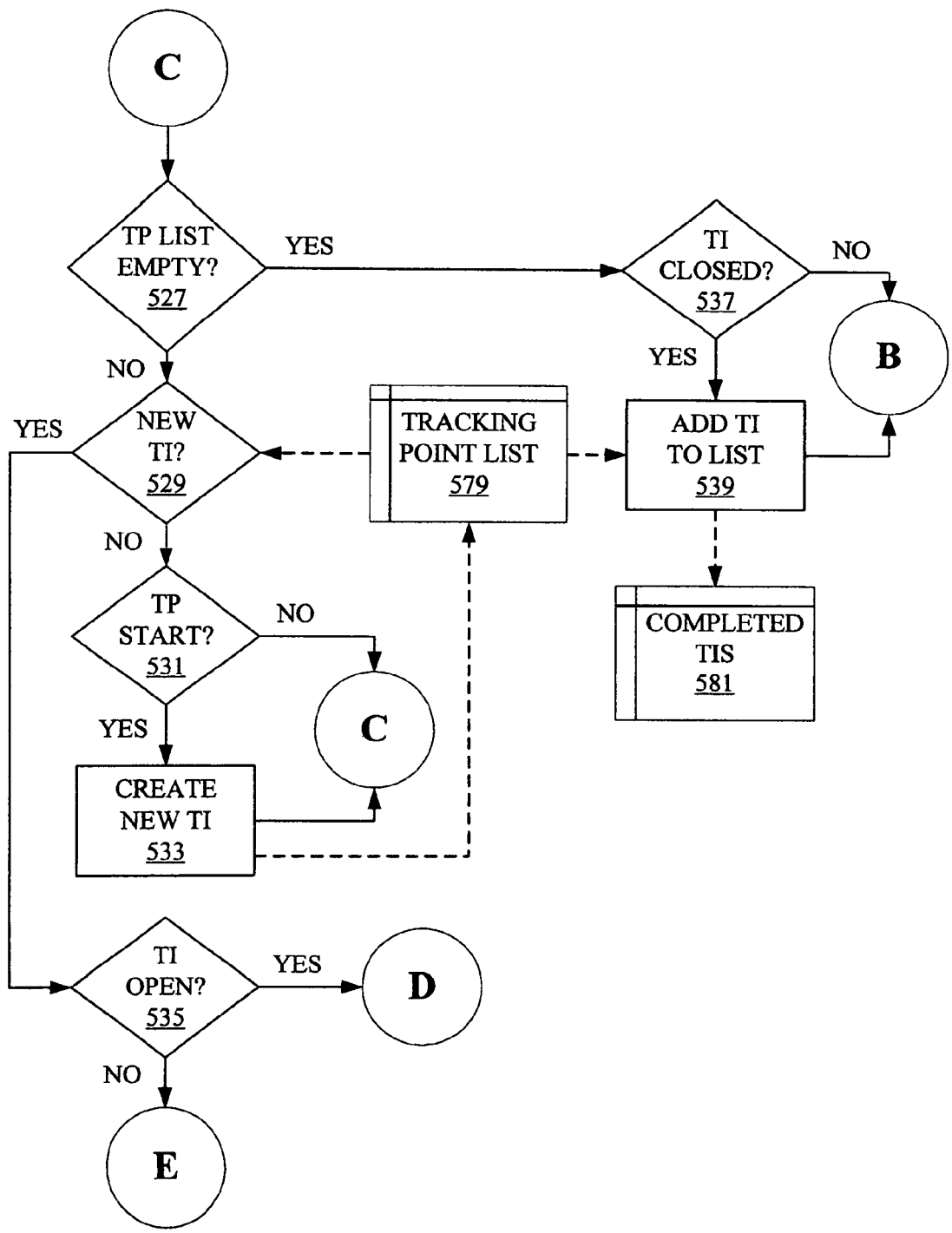
Figure 12D:
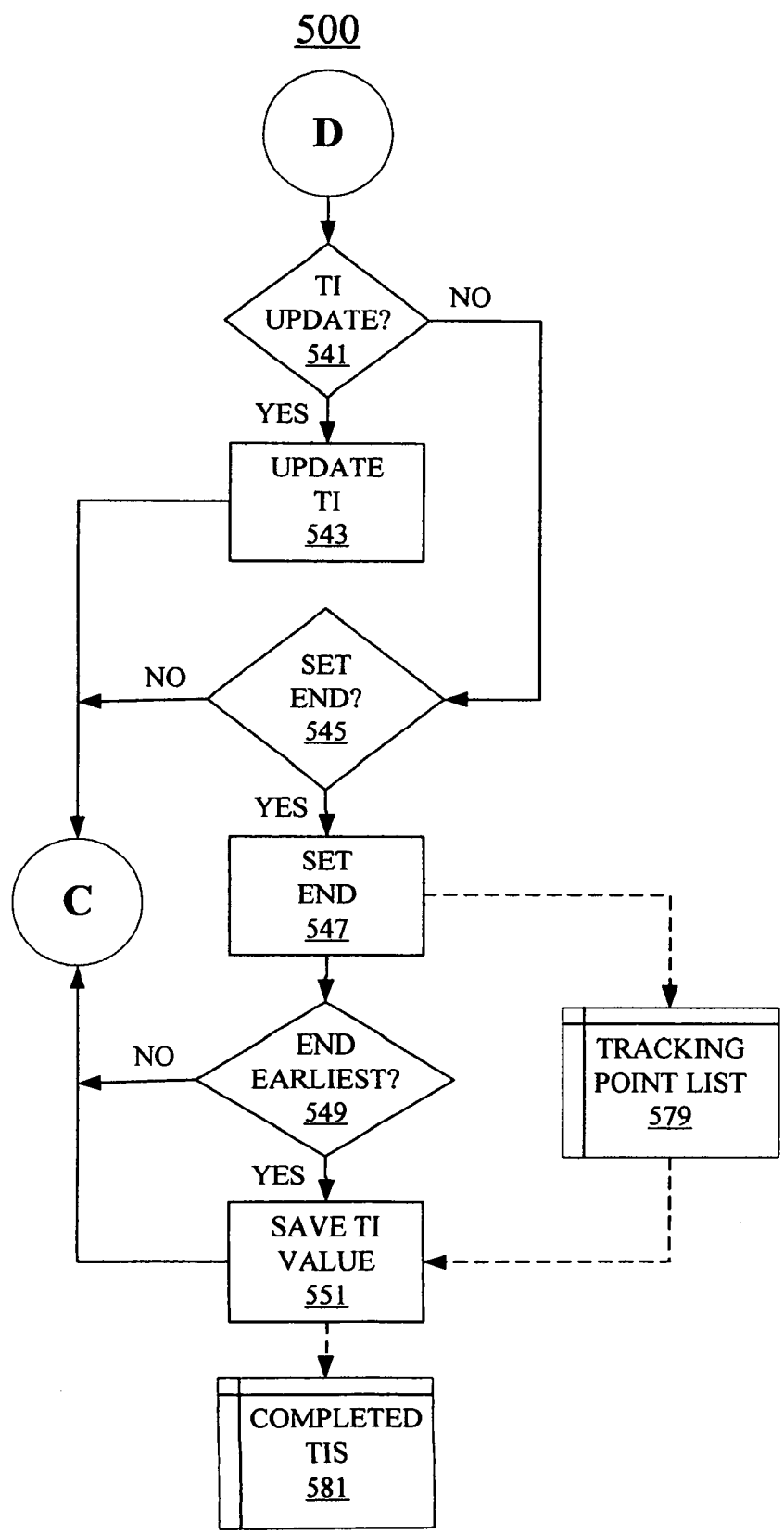
Figure 12E:
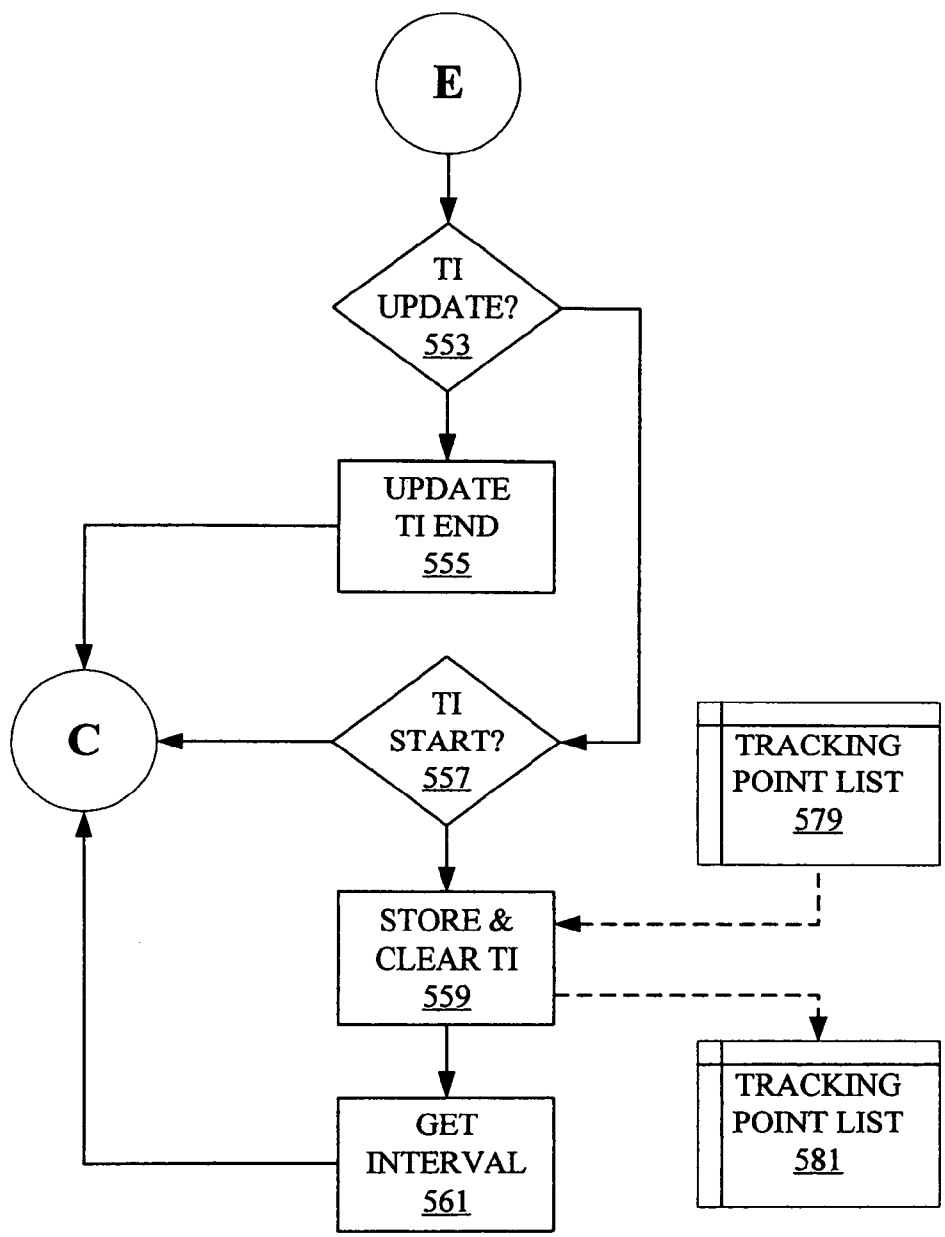

If, in step 505, data store 571 is determined to be empty, then control proceeds to a transition point A, which continues in FIG. 12B. If data store 571 contains tracking points to be processed, then control proceeds to a "Get Definitions" step 507 during which the first tracking point in data store 571 is selected for processing and a tracking point definition associated with the selected tracking point is retrieved from Performance Repository 135. Control then proceeds to a "Get Intervals" step 509 during which any timing intervals associated with the selected tracking point are retrieved from Performance Repository 135. Any particular tracking point may be associated with multiple tracking intervals.

Control proceeds from step 509 to an "Update List" step 511 during which the timing intervals retrieved in step 509 are added to a "Timing Interval List" data store 573. Timing Interval List data store 573 includes all timing intervals currently being processed in TW BPM system 100 (FIG. 1). If any particular timing interval is already in data store 573, the particular timing interval is not added again. Control then proceeds to a "Remove Tracking Point" step 513 the tracking point selected in step 507 is removed from Tracking Point List data store 571. Control then returns to step 505 and processing continues as explained above. In this manner, any timing interval associated with a tracking point in data store 571 is inserted into Timing Interval List data store 573.

In FIG. 12B, transition point A, from step 505 of FIG. 12A, enters a "List empty?" step 515 during which process 500 determines whether or not Timing Intervals List data store 573 is empty. If data store 573 is empty, then control proceeds to an "End Calculate TI" step 599 during which processing is finished. If data store 573 contains timing intervals to be processed, then control proceeds to a "Retrieve Tracking Points" step 517 during which any tracking point values associated with the current functional process are retrieved form Performance Repository 135. These tracking point values, which are stored in a "Tracking Point Values" data store 575, include any tracking points in data store 571. The retrieved tracking point values in data store 575 are sorted in order of associated time values.

From step 517, process 500 proceeds to a "More Intervals?" step 519 during which process 500 determines whether or not each timing interval in Timing Interval List data store 573 has been processed by a "Get Intervals" step 521. If, in step 519, process 500 determines that each timing interval has not been processed, then control proceeds from step 519 to step 521, during which the processing occurs. In step 521, all timing intervals recorded for the current functional task and related to the currently processed timing interval are retrieved for the Performance Repository 135. These retrieved timing intervals are then added to a "Tracking Point List" data store 577. Control then returns to step 519 where processing continues as described above until all timing intervals have been processed by step 521. Once process 500 determines in step 519 that all timing intervals have been processed in step 521, control from step 519 to a "More Intervals?" step 523 during which process 500 determines whether or not all the timing intervals contained in Timing Interval List data store 573 have been processed by a "TP List Empty?" step 527 (see FIG. 5C). The transition from step 523 to step 527 is represented by a transition point C.

If, in step 523, process 500 determines that all intervals have been processed by step 527, then control proceeds to a "Compare Intervals" step 525. Step 525 is executed once the processing of FIGS. 5C, 5D and 5E has been completed, which is represented in FIG. 5B as a transition point B that enters List Empty? step 523. Therefore, an explanation of step 525 is postponed until those figures have been explained. Following step 525, control proceeds to End Calculate TI step 599 during which process 500 is complete.

The portion of process 500 illustrated in FIG. 5C begins at transition point C, which, as explained above, can be reached from List Empty? step 523 as well as from various points in FIGS. 5D and 5E, as explained below. Transition point C enters a "TP List Empty? step 527 during which process 500 determines whether or not all the tracking points associated with the currently processed timing interval have been processed. If no tracking points remain to be processed, then control proceeds to a "TI Closed?" step 537 during which process 500 determines whether or not the currently worked timing interval, stored in a "Tracking Point List" data store 579, is closed, i.e. all associated tracking points have completed. If the currently worked timing interval is not closed, then control proceeds to transition point B and then to step 523 during which processing continues as described above. If the currently worked timing interval is closed, then control proceeds to an "Add TI to List" step 539 during which the current timing interval value stored in Tracking Point list 579 is added to a list of completed timing intervals, or a "Completed TIS" data store 581. Control then proceeds to transition point B and continues as explained above.

In TP list Empty? step 527, if the all the tracking point values have not been processed, then control proceeds to a "New TI?" step 529 during which process 500 determines whether or not there is a new tracking interval value, which, if it exists, would have been stored in Tracking Point List data store 579. If there is a tracking point value in data store 579, then control proceeds to a "TI Open?" step 535 during which process 500 determines whether or not the timing interval currently being processed is "open," i.e. the timing interval has a start value but no end value. If the currently processing timing value is open then control proceeds to a transition point D, otherwise control proceeds to a transition point E.

If, in step 529, process 500 determines there is not a new tracking point value, then control proceeds to a "TP Start?" step 531 during which process 500 checks currently processing tracking point value to determine whether or not the tracking point value can start the current timing interval. If the timing interval can not be started, then control proceeds to transition point C, otherwise, to a "Create New TI" step 533 during which process 500 creates a new timing interval by recording the current tracking point value as the new timing intervals start time and storing the new timing point value in data store 579. Control then proceeds to transition point C.

The portion of process 500 illustrated in FIG. 5D begins at transition point D, which, as explained above, can be reached from TI Open? step 535. Transition point D proceeds to a "TI Update?" step 541 during which process 500 determines whether or not the current tracking point value can update the start value of the current timing interval. An update is called for if the current timing interval has its start value set to "Calculate from latest point" (Item 419, FIG. 9). If an update is called for, then control proceeds to an "Update TI" step 543 during which the start time and the start point value of the current timing interval is updated. Control then proceeds to transition point C.

If, in step 541, process 500 determines that the current timing interval start point can not be updated, then control proceeds to a "Set End?" step 545 during which process 500 determines whether or not the current tracking point value can end the current timing interval. If not, then control proceeds to transition point C, otherwise control proceeds to a "Set End" step 547 during which the end value of the current timing interval is set to the current tracking point value. In addition, the current timing interval is marked with a status of "Closed." Both the time value and the status value are stored in data store 579. Process 500 then continues in an "End Earliest?" step 549.

In End Earliest? step 549, process 500 determines whether or not the current timing interval has its end point defined as "Calculate from earliest point" (Item 429, FIG. 9). If not, processing proceeds to transition point C; and, otherwise, processing proceeds to a "Save TI Value" step 551 during which the current tracking point value is saved to Completed TIS data store 581. Further, the value of the current timing interval is cleared from Tracking Point List data store 579. Control then proceeds to transition point C.

The portion of process 500 illustrated in FIG. 5E begins at transition point E, which, as explained above, can be reached from TI Open? step 535, described in conjunction with FIG. 5C. Control proceeds from transition point E to a "TI Update?" step 553 during which the current timing interval has a status of "Closed," i.e. the interval has assigned values for both a start point and an end point. Process 500 determines whether or not the current timing interval is defined such that the end point can change. The end point of a timing interval can change if the end point has been defined as "Calculate form latest point" (Item 429, FIG. 9). If the end point of the current tracking point can be updated, then control proceeds to a "Update TI End" step 555 during which the end point is updated based upon the current tracking point. Control then proceeds to transition point B.

If, in step 553, the current timing interval is configure such that the end point can not be updated, i.e. the end point has been defined as "Calculate from earliest point" (Item 429, FIG. 9), then control proceeds to a "TI Start?" step 557 during which process 500 determines whether or not the current tracking point is can act as the start of another timing interval value for the current timing interval. If not, control proceeds to transition point B. If so, control proceeds to a "Store and Clear TI" step 559 during which the current timing interval is completed and added to the list of completed TIs, data store 581. In addition, the timing interval currently being calculated is cleared. Control then proceeds to a "Get Interval" step 561 during which process 500 creates a new timing interval value with the current tracking point as its start point. The new timing interval value is designated as the current timing interval by storing it in data store 579. Control then proceeds to transition point B.

Finally, we return to Compare Intervals step 525, which was first introduced in conjunction with FIG. 5B. In step 525, Tracking Point List data store 581 now contains all the timing intervals that should be in performance Repository 135 in conjunction with the timing intervals in Timing Interval List data store 573. A list of timing interval values currently in Performance Repository 135 is stored in Tracking Point List data store 577. The timing interval values stored in data store 577 is compared with the list stored in data store 581 and the minimum number of deletions and additions is applied to Performance Repository 135 so that the records in Performance Repository 135 agree with data store 581. As mentioned above, control then proceeds from step 525 to End Calculate TI step 599 during which process 500 is complete.

Figure 13:
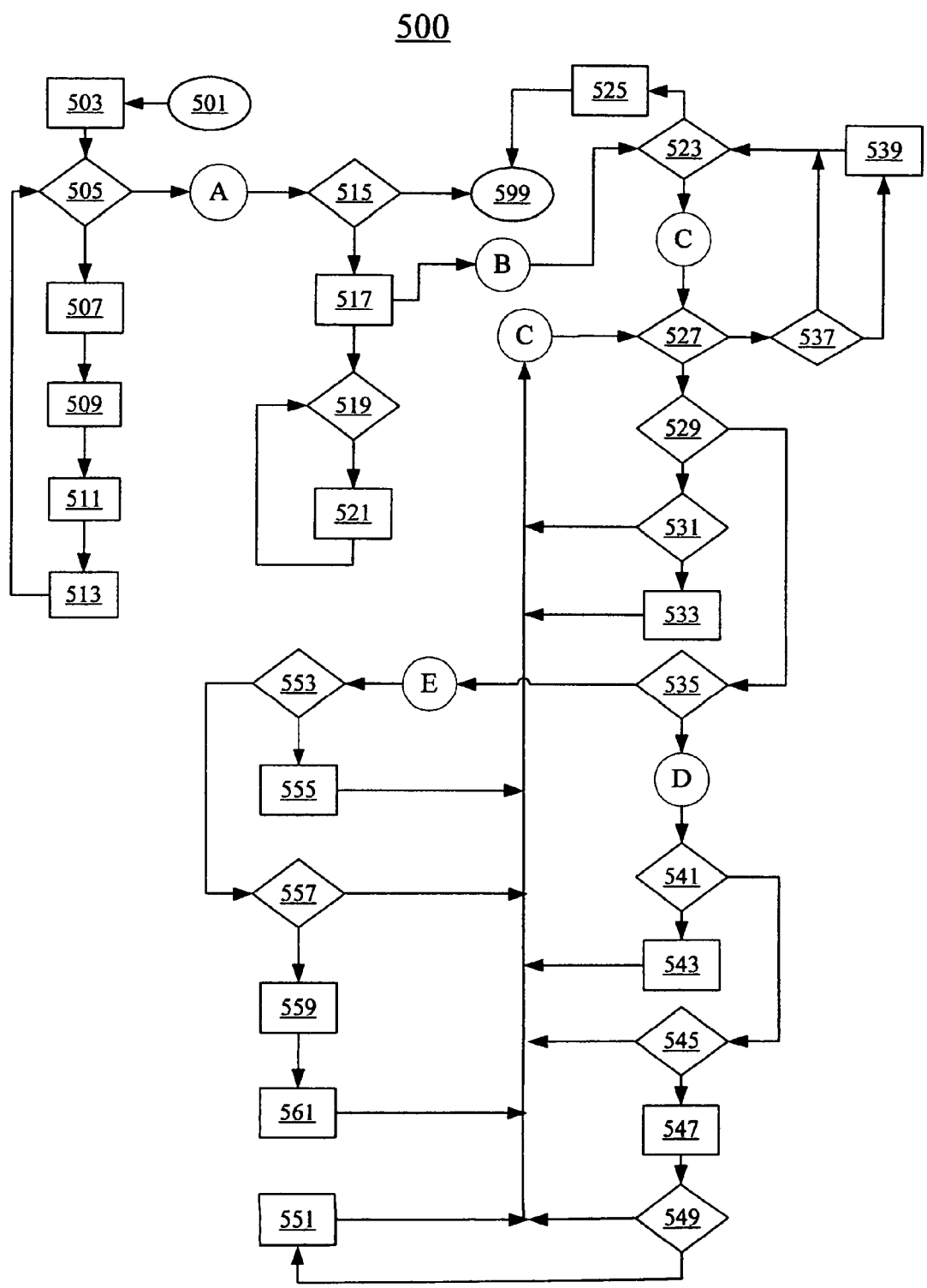
FIG. 13 is an overview of the timing interval calculation process illustrated in FIGS. 12A through 12E, showing processing steps and transition points.

FIG. 13 is a flowchart that illustrates process 500, including processing steps and transition points. In other words, FIG. 13 is an overall view of FIGS. 12A through 12E. Data stores shown in FIGS. 12A through 12E are not included in FIG. 13.

Figure 14:
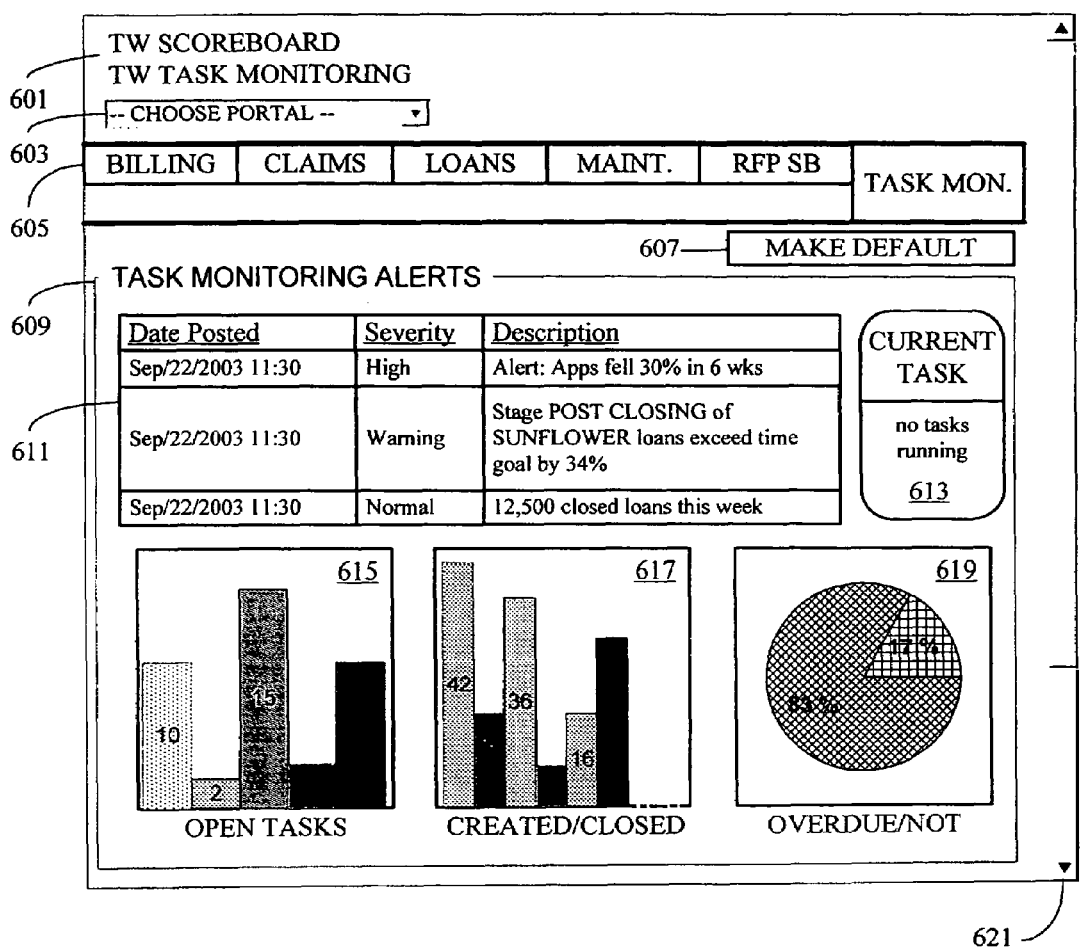
FIG. 14 is an exemplary Scoardboard/Task Monitoring window.

FIG. 14 is an exemplary Scorecard/Task Monitoring window 600, which would be displayed on a monitor or display device (not shown) of a computing system that implements system 100. A title bar 601 shows the name of the window, i.e. "TW Scoreboard/TW Task Monitoring." A Choose Portal selection box 603 enable a user of system 100 to view various components of system 100 via custom portals 123 (FIGS. 1 and 4). A menu bar 605 provides the user means to view various sub-components of system 100 or, in this example, a "Billings," "claims," "Loans," "Maintenance," "RFB SB" and a "Task Monitoring" function. In this figure, the Task Monitoring functionality of window 600 is selected, as indicated by the fact that it is highlighted and expanded. A selection button 607 enable the user to save the currently selected functionality as the default, or the functionality that is displayed when window 600 is first instantiated.

Since Task Monitoring functionality is selected, a Task Monitoring Alerts window pane 609 is displayed. A Task Alert table 611 within pane 609 displays various messages that system 100 has posted concerning various processes that have recently been active. A Current Task window pane 613 indicates that no task is actually running during this snapshot of window 600. Also included in pane 609 are several graphs 615, 617 and 619, which depict graphical representations of exemplary metrics corresponding to processes managed by system 100. Finally, a slider bar 621 indicates that there is more of window 600 that is not being displayed due to the length of the monitor on which window 600 is presented. Moving slider bar 621 enables the user to display currently obscured portions of window 600.

Window 600 is only one example of a GUI of system 100. Other windows enable a user to define both tasks and graphical representations of those tasks. For example, there are windows that enable the user to define graphs such as bar graphs 615 and 617 and pie chart 619 corresponding to other processes and metrics. Window 600 and other windows that are not shown enable users to define processes, reports on those processes and various monitoring representations without needing to actually write computer code to query the various databases. As explained above, this is defined as a "Zero-code" approach provided in system 100.

FIG. 15 illustrates a partial table 650 of a typical normalized data table (not shown), organized according to standard business practices. The data of table 650, based upon a record for an automobile, is used only as an example. Typically, most business data is stored according to the normalization principles illustrated in FIG. 15. In this example, table 650 includes three colums: a "Record ID" column, a "Field Name" column and a "Value" column. The Record ID column enables a DBMS to correlate records corresponding to a specific item, in this case an automobile. For example, the first four rows of table 650 all share a value in the Record ID column equal to '1', indicating that these four rows correspond to a record for one particular automobile. The fifth through eighth rows store information corresponding to a second particular automobile.

The Field Name column contains information indicating the type of information stored in the corresponding row. The value column contains information corresponding to a specific value for the corresponding type of information. For example, the first row contains information on a particular automobile, i.e. the color of the automobile, which happens to be red. The second through fourth rows indicate that the first automobile has four doors, an automatic transmission and is a Chevrolet.

Table 650 is organized such that one logical record is stored in four different rows. In actuality, if table 650 represented an actual automobile, one logical record would typically require tens or hundreds of rows. In order for a BPMS or other software that accesses table 650 to gather all information on a particular automobile the DBMS joins first must join rows based upon matching values in the record ID column. This issue make table 650 difficult to query arbitrarily. For example, the query "Find all 4-door automobiles with an automatic transmission" is executed with code such as the following:

```
Select Record ID from Table 650 where
    (Field Name = '# of Doors' AND
    value = 4)
    OR
```

-continued

```
(Field Name = 'Transmission' AND
    value = 'auto')
Group by Record ID
having (count(*) = 2".
```

FIG. 16 illustrates a partial "denormalized" table 660, according to the claimed subject matter, based upon normalized partial table 650. Unlike table 650, which is long and skinny, table 660 is short and fat. Each logical record, representing a particular automobile, is stored in one record, or row. Each row includes a "Color" column, a "# of Doors" column, a "Transmission" column and a "Make" column. In other words, the information stored in the first four rows of table 650 is all stored in the first row of table 660. In contrast to table 650, table 660 is easy to query. For example, the same query described above, "Find all 4-door automobiles with an automatic transmission," is executed code such as the following:

```
Select * from table 660 where
    '# of Doors = 4 AND
    Transmission = 'Auto'.
```

The claimed subject matter takes advantage of the fact that a denormalized table, such as table 650, which is not typically employed in standard DBMSs is easier to query when queries are arbitrary such as in system 100 (FIG. 1).

While various embodiments of the application have been described, it will be apparent to those of ordinary skill in the art that many more embodiments and implementations are possible that are within the scope of this invention. For example, the methods are applicable to many type of processing systems and specific information fields within the information frames described above are used as examples only. Other embodiments may add or subtract particular fields. In addition, alternative embodiments may use additional or fewer steps or execute the steps in a different order than described in the specification. Accordingly, the invention is not to be restricted except in light of the attached claims and their equivalents.

SUMMARY OF THE INVENTION

Provided is a system and method for calculating a time duration for a process or portion of a process. Although applicable to a wide variety of processes, the claimed subject matter, for the sake of simplicity, is described with regard to a business process.

Any particular business process can be viewed in a number of ways. For example, one view may be based upon actual physical functions performed during the execution of the process, or an execution process view. In a second view, the process may be viewed from a high-level business view, or business process view. Issues arise when a user from a business process perspective requires information based upon an execution process view. One particularly difficult issue in this context is the calculation of timing intervals.

A timing interval based upon a single business process view may depend upon multiple execution process paths, each corresponding to the single business process view. For example, in a loan approval business process, one of two loan review processes may be employed depending upon the size of the loan. The claimed subject matter separates the business process definition form the execution process definition such that tracking points that do not depend upon any particular execution process definition may be inserted into the business process. Thus, the claimed subject matter provides a timing interval calculation based upon two or more tracking points such that the timing interval remains valid even though the process may be comprised of multiple execution paths and even through an execution process may have been modified.

This summary is not intended as a comprehensive description of the claimed subject matter but, rather is intended to provide a short overview of some of the matter's functionality. Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

We claim:

1. A method for reporting a duration of a functional process independently of an execution path of the process, comprising the steps of:
    defining a functional definition of a process;
    defining an execution definition of the process, wherein the execution definition, for reporting purposes, is independent of the functional definition;
    defining a plurality of starting tracking points, each starting tracking point associated with a particular first event of the execution definition;
    defining a plurality of ending tracking points, each ending tracking point associated with a particular second event of the execution definition; and
    calculating a timing interval corresponding to the functional definition based upon a first execution time corresponding to one of the plurality of starting tracking points and a second execution time corresponding to one of the plurality of ending tracking points.

2. The method of claim 1, wherein the functional definition of the process can be redefined without redefining the execution definition of the process.

3. The method of claim 1, wherein the step of defining the functional definition is performed in a zero-code manner.

4. The method of claim 1, wherein the process is a business process.

5. The method of claim 1, wherein the first execution time corresponds to an earliest occurrence of an event associated with one of the starting tracking points.

6. The method of claim 1, wherein the first execution time corresponds to a latest occurrence of an event associated with one of the starting tracking points.

7. The method of claim 1, wherein the second execution time corresponds to an earliest occurrence of an event associated with one of the ending tracking points.

8. The method of claim 1, wherein the second execution time corresponds to a latest occurrence of an event associated with one of the ending tracking points.

9. A business process reporting system, comprising:
    a computing system;
    an output device coupled to the computing system;
    logic, executed on the computing system, for defining a functional definition of a process;
    logic, executed on the computing system, for defining an execution definition of the process, wherein the execution definition, for reporting purposes, is independent of the functional definition;
    logic, executed on the computing system, for defining a plurality of starting tracking points, each starting tracking point associated with a particular first event of the execution definition;

logic, executed on the computing system, for defining a plurality of ending tracking points, each ending tracking point associated with a particular second event of the execution definition;

logic, executed on the computing system, for calculating a timing interval corresponding to the functional definition based upon a first execution time corresponding to one of the plurality of starting tracking points and a second execution time corresponding to one of the plurality of ending tracking points; and logic, executed on the computing system, for transmitting to the output device information corresponding to the timing interval.

10. The system of claim 9, wherein the functional definition of the process can be redefined without redefining the execution definition of the process.

11. The system of claim 9, wherein the process is a business process.

12. The system of claim 9, wherein the first execution time corresponds to an earliest occurrence of an event associated with one of the starting tracking points.

13. The system of claim 9, wherein the first execution time corresponds to a latest occurrence of an event associated with one of the starting tracking points.

14. The system of claim 9, wherein the second execution time corresponds to an earliest occurrence of an event associated with one of the ending tracking points.

15. The method of claim 9, wherein the second execution time corresponds to a latest occurrence of an event associated with one of the ending tracking points.

16. A computer readable medium encoded with a program, the program comprising:

a recording medium;

logic for defining a functional definition of a process;

logic for defining an execution definition of the process, wherein the execution definition, for reporting purposes, is independent of the functional definition;

logic for defining a plurality of starting tracking points, each starting tracking point associated with a particular first event of the execution definition;

logic for defining a plurality of ending tracking points, each ending tracking point associated with a particular second event of the execution definition;

logic for calculating a timing interval corresponding to the functional definition based upon a first execution time corresponding to one of the plurality of starting tracking points and a second execution time corresponding to one of the plurality of ending tracking points; and logic for transmitting to the output device information corresponding to the timing interval.

17. The computer readable medium of claim 16, wherein the functional definition of the process can be redefined without redefining the execution definition of the process.

18. The computer readable medium of claim 16, wherein the process is a business process.

19. The computer readable medium of claim 16, wherein the first execution time corresponds to an earliest occurrence of an event associated with one of the starting tracking points.

20. The computer readable medium of claim 16, wherein the first execution time corresponds to a latest occurrence of an event associated with one of the starting tracking points.

21. The computer readable medium of claim 16, wherein the second execution time corresponds to an earliest occurrence of an event associated with one of the ending tracking points.

22. The computer readable medium of claim 16, wherein the second execution time corresponds to a latest occurrence of an event associated with one of the ending tracking points

* * * * *